(12) United States Patent
Yastrebenetsky et al.

(10) Patent No.: US 12,169,528 B2
(45) Date of Patent: Dec. 17, 2024

(54) SYSTEMS AND METHODS FOR WEB CONTENT INSPECTION

(71) Applicant: InfoTrust, LLC, Blue Ash, OH (US)

(72) Inventors: Alexander Yastrebenetsky, Loveland, OH (US); Michael Loban, Cincinnati, OH (US); Andrew Christian Bengel, Cincinnati, OH (US); Lucas Long, Cincinnati, OH (US); Kent Oldham, Cincinnati, OH (US); Divya Narayan, Redmond, WA (US)

(73) Assignee: Info Trust, LLC, Blue Ash, OH (US)

( * ) Notice: Subject to any disclaimer, the term of this patent is extended or adjusted under 35 U.S.C. 154(b) by 22 days.

(21) Appl. No.: 17/234,598

(22) Filed: Apr. 19, 2021

(65) Prior Publication Data

US 2021/0382949 A1    Dec. 9, 2021

Related U.S. Application Data

(60) Provisional application No. 63/035,816, filed on Jun. 7, 2020.

(51) Int. Cl.
*G06F 16/951* (2019.01)
*G06F 21/57* (2013.01)
*G06F 21/62* (2013.01)

(52) U.S. Cl.
CPC .......... *G06F 16/951* (2019.01); *G06F 21/577* (2013.01); *G06F 21/6263* (2013.01)

(58) Field of Classification Search
CPC ... G06F 16/951; G06F 21/577; G06F 21/6263

USPC ........................................................ 707/709
See application file for complete search history.

(56) References Cited

U.S. PATENT DOCUMENTS

| | | | | |
|---|---|---|---|---|
| 2005/0021791 A1* | 1/2005 | Sakiyama | ............... | H04L 67/56 709/225 |
| 2008/0120358 A1* | 5/2008 | Yano | .................. | H04L 65/1069 709/201 |
| 2014/0089782 A1* | 3/2014 | Cook | .................... | G06F 16/957 715/234 |
| 2015/0205776 A1* | 7/2015 | Bhatia | .................... | G06Q 30/02 715/224 |
| 2016/0308706 A1* | 10/2016 | Fu | ............................ | H04L 67/10 |

(Continued)

*Primary Examiner* — Hosain T Alam
*Assistant Examiner* — Saba Ahmed
(74) *Attorney, Agent, or Firm* — Frost Brown Todd LLP

(57) ABSTRACT

A web content inspection system is configured to monitor the activity of web content tags and cookies during interaction with web content. Monitoring may include automated simulations of web content interaction that occur in a virtual browser or environment, as well as real-time monitoring of web content interactions that occur with actual users through a browser or other application. Features may include monitoring of the creation of cookies, writing information to cookies, and reading information from cookies, as well as associating cookies with the tags or scripts that affect them, and displaying such associations in a hierarchical form that indicates the sequence of actions that led to the cookie activity. Other features include monitoring for the presence of high-risk information in plain-text or encoded formats, within a URL or other portion of web content. Other features include determination of overall risk associated with a tag based on its activities.

20 Claims, 13 Drawing Sheets

(56) References Cited

U.S. PATENT DOCUMENTS

2020/0259792 A1\* 8/2020 Devarajan ............. G06F 21/554
2020/0259793 A1\* 8/2020 Pangeni ............. H04L 41/5006

\* cited by examiner

- Web Location Content
    - Tag A
    - Tag B
    - Tag C
        - Tag C.1
        - Tag C.2
            - Tag C.2.1
            - Tag C.2.2
        - Tag C.3

Cookie C.2.1.A

| State Change | Created/Modified/Accessed |
|---|---|
| Cookie Name | ipAddress |
| Cookie Value | 123.456.789.1 |
| Setting Tag Name | Tag C.2.1 |
| Set Method | javascript |
| Cookie Setter URL | http://tagsource.com |
| Secure Attribute | False |
| HttpOnly Attribute | False |
| SameSite Attribute | False |
| Cookie Expiration Date | July 1, 2021 |

Select Report to Display:

| Cookie Activity by Setter | Cookies w/SameSite False |
|---|---|
| Cookie Activity by Tag | Cookies w/PII |
| Cookies By Expiration Date | Unconditional Cookie Activity |

FIG. 5D

SYSTEMS AND METHODS FOR WEB CONTENT INSPECTION

PRIORITY

This application is a non-provisional filing of, and claims the benefit of, U.S. Prov. App. 63/035,816, filed Jul. 7, 2020, and titled "Systems and Methods for Cookie Inspection," the disclosure of which is hereby incorporated herein in its entirety.

TECHNICAL FIELD

Embodiments of the technology relate, in general, to inspection of cookies and other web content.

BRIEF DESCRIPTION OF THE DRAWINGS

The present disclosure will be more readily understood from a detailed description of some example embodiments taken in conjunction with the following figures:

FIG. 5C is an illustration of an exemplary interface for displaying additional data generated by the steps of FIG. 4.

FIG. 5D is an illustration of an exemplary interface for displaying additional reports or views based on the data generated by the steps of FIG. 4.

DETAILED DESCRIPTION

Figure 1:
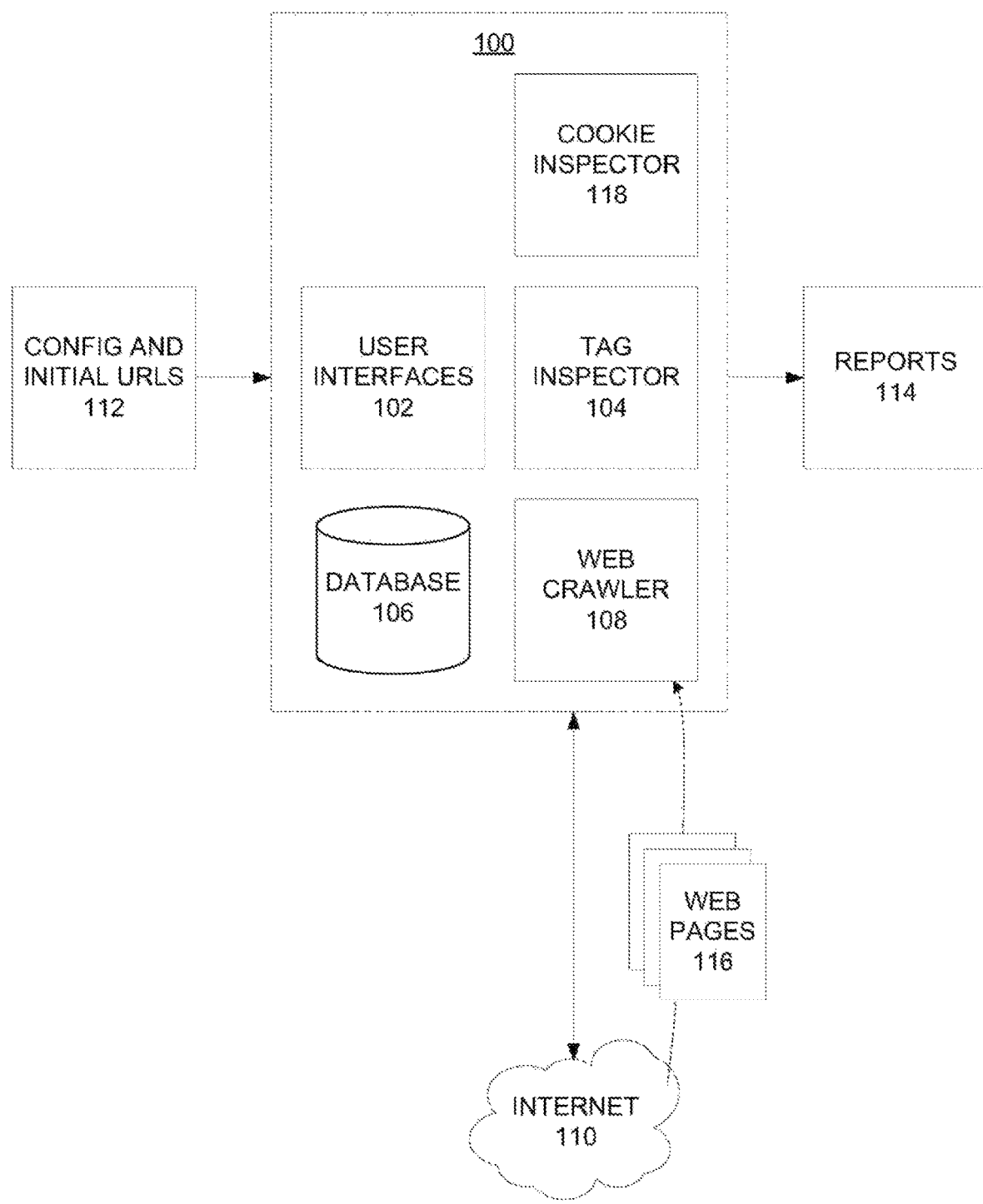
FIG. 1 depicts an example content inspection system, according to one embodiment.

Various non-limiting embodiments of the present disclosure will now be described to provide an overall understanding of the principles of the structure, function, and use of the systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of systems and method for monitoring and inspecting cookies generated by web pages. Although the examples described systems and methods for monitoring and inspecting cookies generated by web pages, the systems and methods described herein can be used to identify, analyze, and inspect other metadata in web pages as well. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

I. Content Inspection System

Referring to FIG. 1, an embodiment of a content inspection system (100) is presented. The content inspection may be used to analyze various types of web content, and may analyze web content at various locations (e.g., accessible at a URL, on a file system of a server, in an FTP directory). Web content may include, for example, websites (e.g., HTML content, or related content), as well as scripts or programs that may load, or be loaded by, HTML content (e.g., *.js files, *.jsp files, *.php files). In some implementations, the content inspection system (100) can aid in automating the discovery and identification of characteristics of web content, such as cookies or other local files generated by webpages, personal identifiable information (PII) stored in those cookies or other files, or and other files or information that is stored or cached while browsing web content. Some implementations of the system can determine whether and under what conditions tags conditionally execute, cookies are created, modified, or accessed, or PII is stored or accessed, and whether such storage or access is in accordance with a user's consent preferences configured and associated with their user account, web browser, or other source. Manually inspecting web pages for such characteristics is not reasonably possible due to the number of cookies that might be created, accessed, or modified when accessing a particular web location (e.g., a URL), the number of unique web locations that might be associated with a single domain (e.g., a website), and the number and complexity of conditions actions that can potentially be performed at each web location.

As an example, a single website might have tens or hundreds of different locations, with each location being associated with ten or more cookies, and each cookie only being created, modified, or accessed based upon conditions that occur for a subset of users accessing the location (e.g., conditions may include whether the user is logged into the website, a geolocation for the user, a device or browser used by the user to access the website, and others). The content inspection system (100) beneficially automates and simplifies the process, allowing hundreds to thousands of web locations to be scanned automatically, across virtual sessions or in real time across a plurality of user sessions. The results of this analysis may be used to determine compliance with user configurations (e.g., such as where a user has opted out of sharing information with third parties), browser configurations (e.g., such as a browser "incognito mode" or do not track setting), software design and development frameworks (e.g., Privacy by Design), or governmental regulations (e.g., the European Union's General Data Protection Regulation (GDPR) or the California Consumer Privacy Act (CCPA)).

The content inspection system (100) can include software modules such as a user interface module (102), a tag inspector module (104), a cookie inspector module (118), and a web crawler module (108). Although they are described as separate modules, this is done for convenience and clarity of exposition only. In various configurations, the modules can be a single module, or further subdivided into multiple modules as would be understood in the art. The content inspection system (100) can include one or more data stores such as a database (106). In an embodiment, the database (106) can execute on a remote server or a cloud-based server that is accessed over the Internet (110) using suitable communication channels and protocols. In embodiments, the Internet (110) can be an intranet or other suitable network. The web crawler module (108) can access web pages (116) or other web content using a data link to connect to networked systems, for example using HTML or hypertext markup language, FTP or file transfer protocol session, secure sockets, a VPN or virtual private network connection, and so forth. In an embodiment, the content inspection system (100) can execute on a computing system that includes locally stored web pages, in which case a network need not be used.

The user interface module (102) can accept configuration information (112), such as rules for identifying marketing and analytic tags, scanning web pages (116) for tags, invoking tags, and crawling web pages (116). Configuration information (112) can include the initial URLs, called seed URLs, for the content inspection system (100) to inspect. URLs or Uniform Resource Locators are web addresses used to access web pages across the Internet (116). Configuration information (112) can include preferences for generating reports (114). Configuration information (112) can be stored by the content inspection system (100) in local memory, a data store, or a database (106). The user interface module (102) can accept other configuration data as would be understood in the art. Screens associated with the user interface module (102) are explained in greater detail below.

The user interface module (102) can be a web-based application or a stand-alone executable as would be appropriate for the particular implementation of the content inspection system (100). For example, in one configuration a user of the content inspection system (100) can use a web-browser, such as Safari™, Opera™, Google™ Chrome™, Internet Explorer™, or the like, that is executing on a computing device to access the user interface module (102) of the content inspection system (100). In accordance with the present disclosure, the content inspection system (100) can be accessed via any appropriate and suitable technique known or yet to be developed as would be understood by one of ordinary skill in the art.

In operation, the content inspection system (100) provides a URL, for example an initial URL or seed URL, to the web crawler module (108). The URL can be configured by a user and stored as configuration information (112). The web crawler module (108) can retrieve a web page associated with the URL from the Internet (110) or another suitable network as described above. The web crawler module (108) can store, or cache, the web page in the database (106). The web crawler module (108) can use web crawling techniques to retrieve other web pages (116) that are linked to, or referenced in, the web page. For example, JavaScript™ can link to other pages; the web crawler module (108) can identify links in JavaScript™ files and retrieve additional webpages. The web crawler module can detect and track each tag present in a web page, and store each tag, web page, JavaScript™ file, and other related information in the database (106).

Tags, including tag management tags, can include instructions or code that when invoked can send analytic and marketing information about how a web page is being used. The web crawler module (108) can invoke one or more tags on one or more web pages (116). When a tag fires, the information sent by the tag can be collected by the content inspection system (100). In a configuration, the web crawler module (108) invokes each tag on a web page or web pages (116). In a configuration, the web crawler module (108) invokes selected tags on web pages (116). The content inspection system collects, analyzes, and determines information about the invoked tags.

The tag inspector module (104) can inspect and analyze the tags. The tag inspector module (104) can compare the tags to tags stored in a library of tags in the database (106). The tags that fire can be added to the library of tags in the database (106). Other information can be stored to the database, including but not limited to web pages (116) obtained by the web crawler module (108) and JavaScript™ files.

The tag inspector module (104) can generate reports (114). In various non-limiting configurations, one or more reports (114) can be generated based on, among other things, the tags that fired, cookies that were set by tags, piggybacking tags that were invoked from other tags, how the tags are configured on the web pages (116), the kinds of tags on each web page (116), which web pages (116) contain tags, and which web pages (116) do not include a particular type of tag, among other kids of reports. The reports (114) can be generated based on settings in the configuration file (112), or generated based on selected criteria from a user.

The cookie inspector module (118) identifies cookies generated by webpages, scripts, and other processes. Cookies, also called browser cookies or web cookies, are locally stored files that save data sent by websites while a user is browsing. They are a popular mechanism for websites to remember information such as the user's browsing activity, items saved to shopping carts, and other information specific to a particular session, or shared across sessions, while the user moves between webpages on a website. However, cookies can also store personal information that describes a user, such as a unique identifier that may be associated with other information stored in a database which may be personally identifiable information or "PII" (e.g., the cookie may contain a primary key that links to a database including the user's name, email address, mailing address, and credit card number). PII that is associated with cookies implicates a privacy concern for users, as PII may be improperly gathered, tracked across web sites, and used by third parties without the knowledge or consent of users, or may be improperly stored or encoded such that it is not well protected. While there are varying technology based reasons to protect user data (e.g., site security, fraud prevention), some governmental bodies have also begun to regulate the storage of PII in cookies by enacting regulations (e.g., GDPR, CCPA). Advantageously, the cookie inspector module (118) can monitor characteristics of cookie generation associated with web content, as will be described in further detail below.

The software modules and database of the content inspection system (100) can execute on one or more suitable computing platforms, for example PC, Mac or Linux based computers, such as a desktop computers, laptops, tablets, servers, or similar computing devices. The operations performed by each software module and the database (106) can be performed by a common server or servers, or executed across multiple servers as would be understood in the art. In embodiments, the software modules and database can include third-party software. The software modules can communicate over networks, such as the Internet (110), using any suitable communication channels and protocols including data links for wired network connections, wireless WiFi/802.11x connections, and mobile wireless communications.

Each software module can include software or other computer instructions executing on suitable computing hardware, such as a dedicated server, a personal computer, a server, multiple computers, a collection of networked computers, a cloud-based computer system, a web-based computer system, or from a storage device, as would be appropriate for the content inspection system (100). Each computing device can include one or multiple processing units, such as central processing units and/or graphics processing units, may perform instructions stored in memory to execute the processes described herein.

Figure 2:
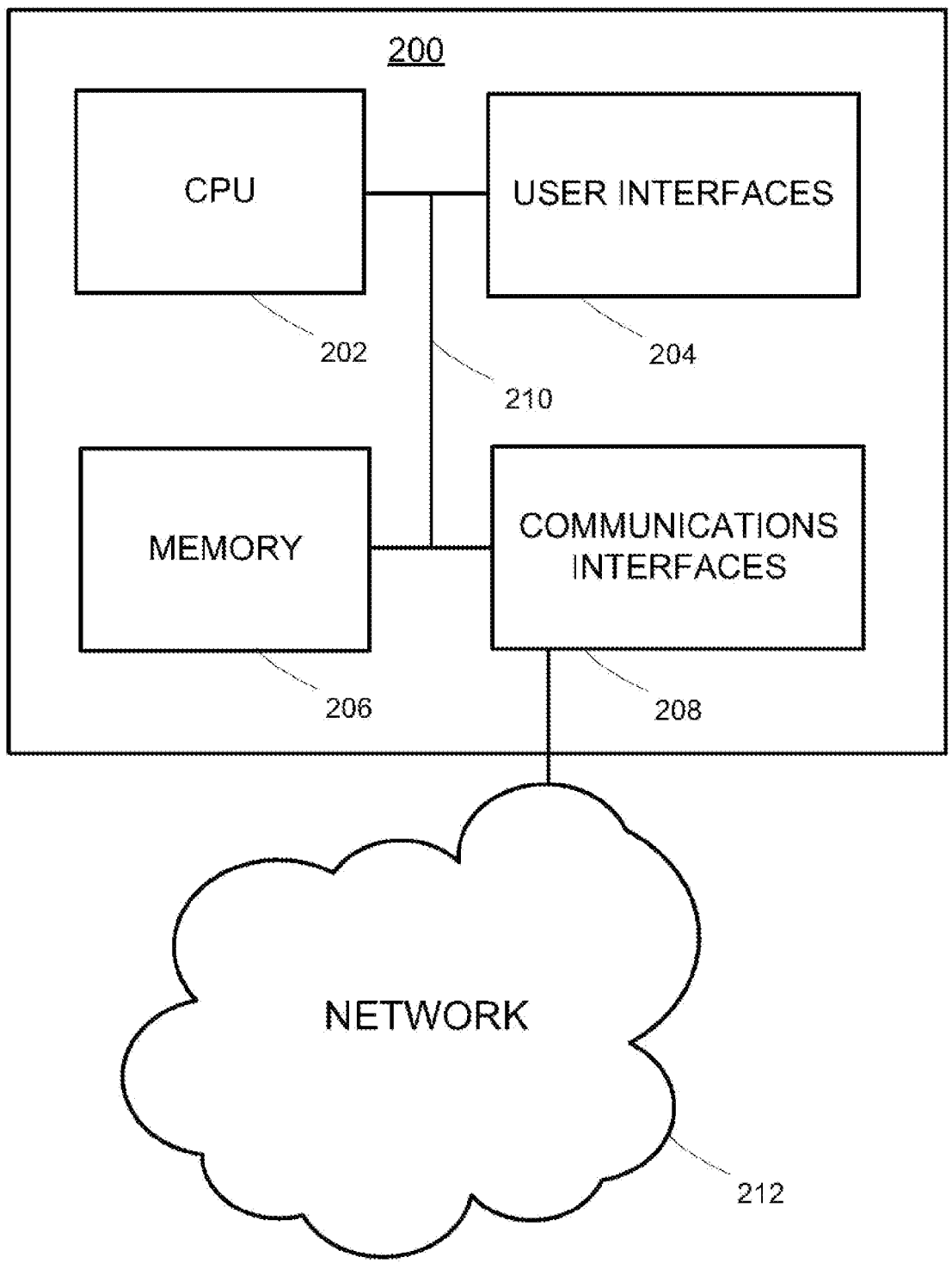
FIG. 2 depicts an example computing device, according to one embodiment.

Referring now to FIG. 2, an example computing device (200) is presented. The processes described herein can be performed on or between one or more computing devices (200). A computing device (200) can be a server, a computing device that is integrated with other systems or subsystems, a mobile computing device, a cloud-based computing capability, and so forth. For example, the computing device (200) depicted in FIG. 2 can be the content inspection system (100) or a processor-based device that executes one or more of the software modules of the content inspection system (100), a personal computing device of the user, and so forth. The computing device (200) can be any suitable computing device as would be understood in the art, including without limitation, a custom chip, an embedded processing device, a tablet computing device, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

Each computing device (200) includes one or more processors (202) that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device (200) also includes one or more memories (206), for example read only memory (ROM), random access memory (RAM), cache memory associated with the processor (202), or other memories such as dynamic RAM (DRAM), static RAM (SRAM), programmable ROM (PROM), electrically erasable PROM (EEPROM), flash memory, a removable memory card or disk, a solid state drive, and so forth. The computing device (200) also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay™ disk, and so forth. Storage media such as flash drives, solid state hard drives, redundant array of individual disks (RAID), virtual drives, networked drives and other memory means including storage media on the processor (202), or memories (206) are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces (208) can be configured to transmit to, or receive data from, other computing devices (200) across a network (212). The network and communication interfaces (208) can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces (208) can include wired data transmission links such as Ethernet and TCP/IP. The communication interfaces (208) can include wireless protocols for interfacing with private or public networks (212). For example, the network and communication interfaces (208) and protocols can include interfaces for communicating with private wireless networks (212) such as a WiFi network, one of the IEEE 802.11x family of networks, or another suitable wireless network. The network and communication interfaces (208) can include interfaces and protocols for communicating with public wireless networks (212), using for example wireless protocols used by cellular network providers, including Code Division Multiple Access (CDMA) and Global System for Mobile Communications (GSM). A computing device (200) can use network and communication interfaces (208) to communicate with hardware modules such as a database or data store, or one or more servers or other networked computing resources. Data can be encrypted or protected from unauthorized access, for example by using secure sockets, virtual private networks, and so forth.

The computing device (200) can include a system bus (210) for interconnecting the various components of the computing device (200), or the computing device (200) can be integrated into one or more chips such as programmable logic device or application specific integrated circuit (ASIC). The system bus (210) can include a memory controller, a local bus, or a peripheral bus for supporting input and output devices associated with the user interfaces (204), and communication interfaces (208). Example input and output devices include keyboards, keypads, gesture or graphical input devices, motion input devices, touchscreen interfaces, one or more displays, audio units, voice recognition units, vibratory devices, computer mice, and any other suitable user interface.

The processor (202) and memory (206) can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

In some implementations, the features of the cookie inspector module (118) may be combined with the features of the tag inspection module (104), such that each operates on content at a particular web location (e.g., either in parallel, or in sequence). In some implementations, the content inspection system (100) may only include the cookie inspector module (118), or may only include the tag inspector module (104). Some implementations of the tag inspection module (104) are described in U.S. Pat. No. 10,609,113, entitled "Systems and Methods for Tag Inspection," the entirety of which is hereby incorporated by reference herein.

Figure 3:
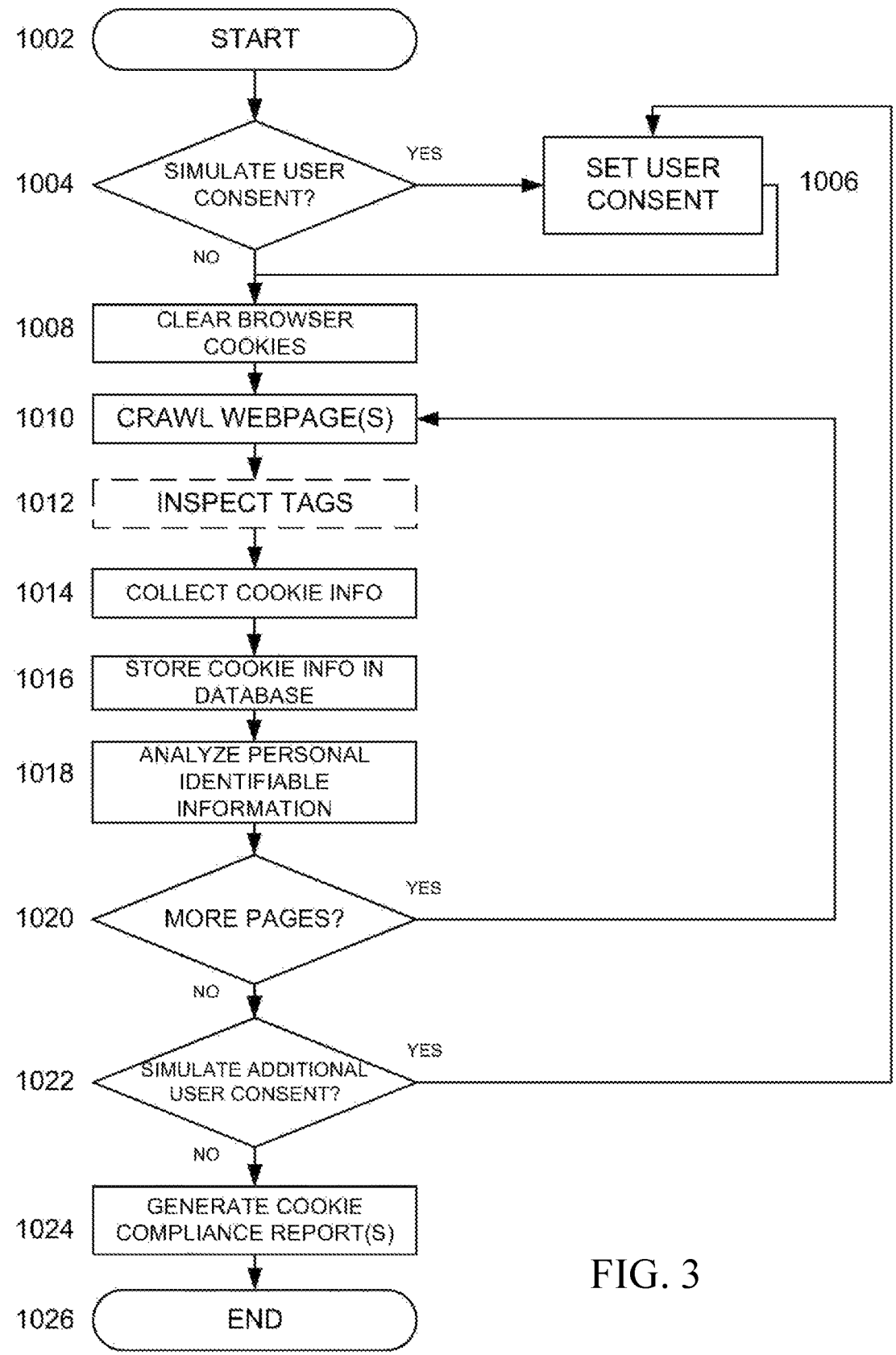
FIG. 3 is a flowchart of an exemplary set of steps that may be performed with the content inspection system of FIG. 1.

Referring now to FIG. 3, an example flow diagram of the high level operation of the content inspection system (100) is presented. Processing starts at start block (1002) and continues to decision block (1004).

In blocks (1004) and (1006), the content inspection system (100) can simulate different user consent configurations so as to determine whether the webpage is properly storing cookies and processing data in accordance with users' consent preferences. When users access websites through a browser, users can optionally set consent preferences that determine whether or not a website has permission to store information, such as the users' personally identifiable information (PII), in cookies. For example, a user's consent preferences may allow for cookies used for content personalization, which may be associated with certain PII, to be stored temporarily only in that single session of the user while browsing the website at issue. Another user may consent to cookie information, which may be associated with their PII, being stored for a longer period of time, which may allow the user to return to the website at a later time whereupon the website can retrieve the user's stored information, which be associated with PII, from more persistent cookies.

In decision block (1004), if a particular user consent configuration is to be simulated, the processing proceeds to process block (1006) where a selected user consent configuration is set prior to continuing to process block (1008). Otherwise, if user consent configurations are not being simulated then processing proceeds directly to process block (1008) using default consent preferences.

At process block (1008), the content inspection system (100) clears cookies from the browser so that any cookies that are saved by the browser upon opening and accessing a webpage can be accurately determined. In embodiments, this can be performed, for example, by executing a new virtual browser session which has no cookies stored in memory when the virtual browser is instantiated. In other embodiments, existing cookies in memory can be deleted prior to opening the webpage to ensure that any cookies are properly attributed to the current target webpage and not a previous webpage. Processing continues to process block (1010).

At process block (1010), the URL associated with a target webpage is opened by the browser, which may be a virtual browser instances as described above with regard to process block (1008). Processing continues to process block (1012), where the content inspection system (100) may optionally inspect tags.

In some implementations, the content inspection system (100) can temporally trace and correlate cookies that are being stored by the browser with tags that set the cookies. In a first example, HTTP response headers can be monitored to determine if a cookie is being set. The Response URL is then compared with tags in a tag library to determine which tag set the cookie. In a second example, the content inspection system (100) can perform a JavaScript stack trace of executions that occurred immediately before the call to set the cookie. The script URL that made the call to set the cookie can be compared with the tag library to identify the tag that set the cookie. As described below for process block (1016), the cookie can be stored associatively with the tag that set the cookie. Processing continues to process block (1014).

At process block (1014), the content inspection system (100) collects the cookies set by the webpage. In embodiments, a JavaScript snippet can be substituted into a webpage that overrides and imitates the original native cookie object. When the cookie is called by the JavaScript, the information being set by the cookie can be obtained, and that information can be used to save the native cookie object. In embodiments, HTTP Responses can be monitored for the 'Set-Cookie' response header. In embodiments, cookies can be obtained by examining the browser memory to determine if any new cookies have been stored in memory. One or a combination of approaches can be used to ensure that all cookies are captured. Processing continues to process block (1016).

At process block (1016), each cookie is stored in the database. In embodiments, cookies can be correlated or associated with tags identified in process block (1012). Processing continues to process block (1018).

At process block (1018), the content inspection system (100) can examine the information stored in each cookie to determine what, if any, personally identifiable information (PII) has been stored in each cookie. Example PII can include names, addresses, passwords, credit card numbers and so forth. Processing continues to decision block (1020).

At decision block (1020), additional webpages can be scanned by returning to process block (1010), otherwise processing continues to decision block (1022).

At decision block (1022), if additional user consent preferences are to be tested, then processing continues back to process block (1006) where a different user consent preference is set. Otherwise processing continues to process block (1024)

At process block (1024), the content inspection system (100) can generate suitable compliance reports. For example, if the content inspection system (100) is being used to test whether user consent preferences have been implemented properly by a website, the content inspection system (100) can generate an audit report as to whether the inspected webpages stored information that may be associated with PII in cookies in accordance with the user's consent preferences. Processing then terminates at end block (1026).

Generally, the operations described in process blocks and decision blocks (1004) through (1024) can be performed in any suitable order, as would be understood by one of ordinary skill in the art.

II. Cookie Inspection

Figure 4:
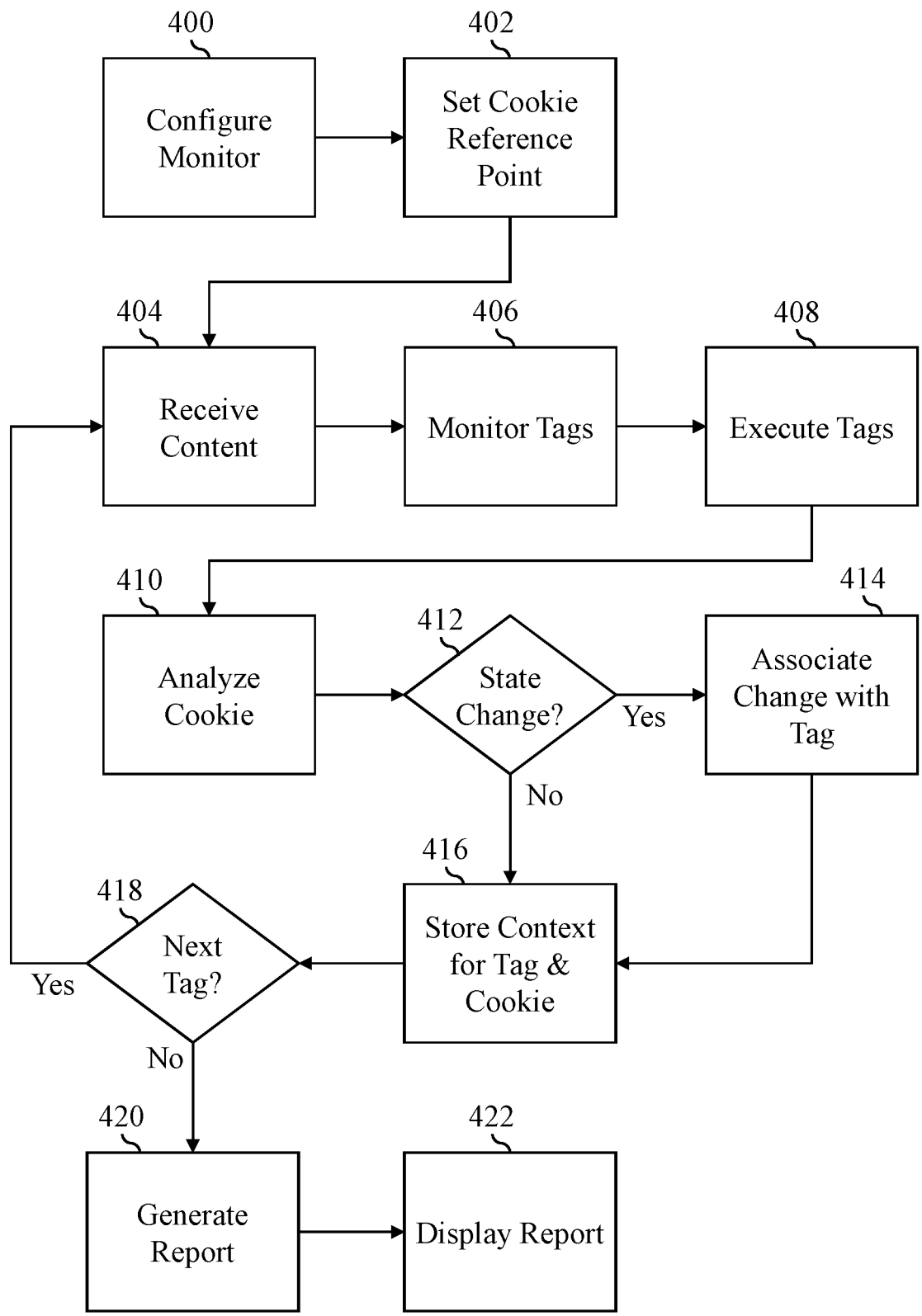
FIG. 4 is a flowchart of an exemplary set of steps that may be performed with the content inspection system of FIG. 1 to monitor the creation and use of cookies.

As has been described, some implementations of the content inspection system (100) may be configured to provide one or more cookie inspection features. Additional aspects of cookie inspection are illustrated in FIG. 4, which shows a flowchart of an exemplary set of steps that may be performed with a system such as the content inspection system (100) to monitor the creation and use of cookies when web content is accessed or interacted with. While the discussion of FIG. 4, as well as the discussion of cookie inspection or monitoring more generally, will focus on cookies (e.g., small portions of data stored and associated with web content user sessions), it should be understood that the features and concepts may be readily applied to other stored or cached data that is associated with web content, whether on a server or client, and so the scope of these disclosed features is not confined to use with cookies.

The system may search web content for portions that interact with cookies by searching the content itself (e.g., text searching of *.html and related files), by monitoring the content as it is interpreted and/or executed by a web browser or other application, or both (e.g., collectively, "monitoring." Configuring (400) a monitor to perform such functions may be accomplished in varying ways. As an example, in some implementations the monitor may be configured on a server (e.g., by placing configuration files on the server, editing via command line, or configuring via a web page or other interface) and executed by the server using a virtual browser or other application that can receive, interpret, execute, and otherwise process web content entirely on the server (e.g., "server side"). As another example, in some implementations the monitor may be configured through server configurations, web content configurations, client configurations, and combinations of the above. In such configurations, the monitor may be capable of "real time" monitoring for cookie usage, such as where a client accessing web content is configured (e.g., by scripts delivered in the web content, or by a client side application) to provide information to the server to aid in monitoring. Each has advantages, for example, server side monitoring may provide more controlled results that will not be influenced by client variances (e.g., browsers, operating systems, network configurations), while real time monitoring may provide for a wider range of scenarios to be tested, which may allow for rare or conditional scenarios to occur and be monitored. It should be understood that any of the features herein may be implemented as server side processes (e.g., occurring primarily or entirely on a server with the use of a "virtual browser" or other application) or real time processes (e.g., occurring during an actual user session through communication between the client and server).

The system may also set (402) a cookie reference point in order to provide a known, controlled starting point for the state of cookies prior to interactions with the web content. In some implementations, setting (402) the reference point may include deleting or removing all current cookies in order to provide a fresh starting point, while other implementations may instead take a snapshot of the current state of cookies (e.g., the contents and metadata associated with each current cookie). In either case, the cookie reference point provides a comparison point that may be referred to as web content is interpreted in order to identify any changes (e.g., creation of a new cookie, accessing a currently existing cookie, modifying a currently existing cookie).

The system may then receive (404) web content by accessing or requesting web content (e.g., an http or other request to a specific URL, set of listed URLs, set of URLs determined by a "spider" or bot, or other sources). As web content is received (404) the system may monitor (406) for any tags included in the content. A tag may be a script (e.g., a client side script or other code delivered via web content and executed by a client), tracking asset (e.g., an invisible image or other asset hosted at a remote source that, when requested or delivered, causes script-like activity to occur), or other portion of web content that may prompt the creation, access, or modification of cookies. Tag monitoring (406) may include identifying tags based upon their syntax or form, monitoring the web document state for changes that occur after the web content is initially received and interpreted, or providing specialized tag engines that provide additional monitoring capabilities beyond the default (e.g., a JavaScript interpreter or compiler that provides additional monitoring hooks and output). While monitoring (406) tags, the system may then begin to execute (408) the tags, which may include operating a tag engine or other application to execute the logic and actions associated with the tag (e.g., executing JavaScript, requesting a tracking asset from a remote location).

As tags are executed (408), the system will also monitor or analyze (410) the cookies (e.g., some or all of the cookie contents, the data being sent to a cookie, the data collected from the cookie), with reference to the set (402) cookie reference point, to determine the impact of each executed (408) tag on the state of cookies. Execution of tags (408) may occur in series, or in parallel, and in any case analysis (410) of the impact on cookies may include monitoring for state changes in the file system or storage system, examining tags for cookie specific syntax, or other analysis. As state changes are detected (412) as a result of tag execution, the change will be associated (414) with that tag and the system may store (416) the context of that tag and any associated cookies. Such context will vary, and may include the association between the tag and cookie, session state or other characteristics when the change occurred (e.g., user logged-in, user referred from another web location), the particular change that occurred (e.g., created, accessed, modified), the contents of the cookie, the source of the tag (e.g., originally included in web content, added to web content by another tag), browser type (e.g., virtual or client, and client type) and other information. Where no state change (412) is detected, the system store (416) the context of that tag and indicate that no change to cookies occurred. Tags originally included in the web content may, when executed, insert additional tags from remote sources, and so as each tag is executed additional tags may be introduced that will also be executed. Thus, as the context for each tag is resolved, the system may determine if there is a next (418) tag to be processed, whether originally included or subsequently added, and if there is the system will repeat the process of receiving (404) any additional web content (e.g., such as where a tag incorporates additional tags or assets from a remote source), monitoring (406) the next tag, executing the next tag (408), and so on until no tags remain (418).

Figures 5A, 5B:
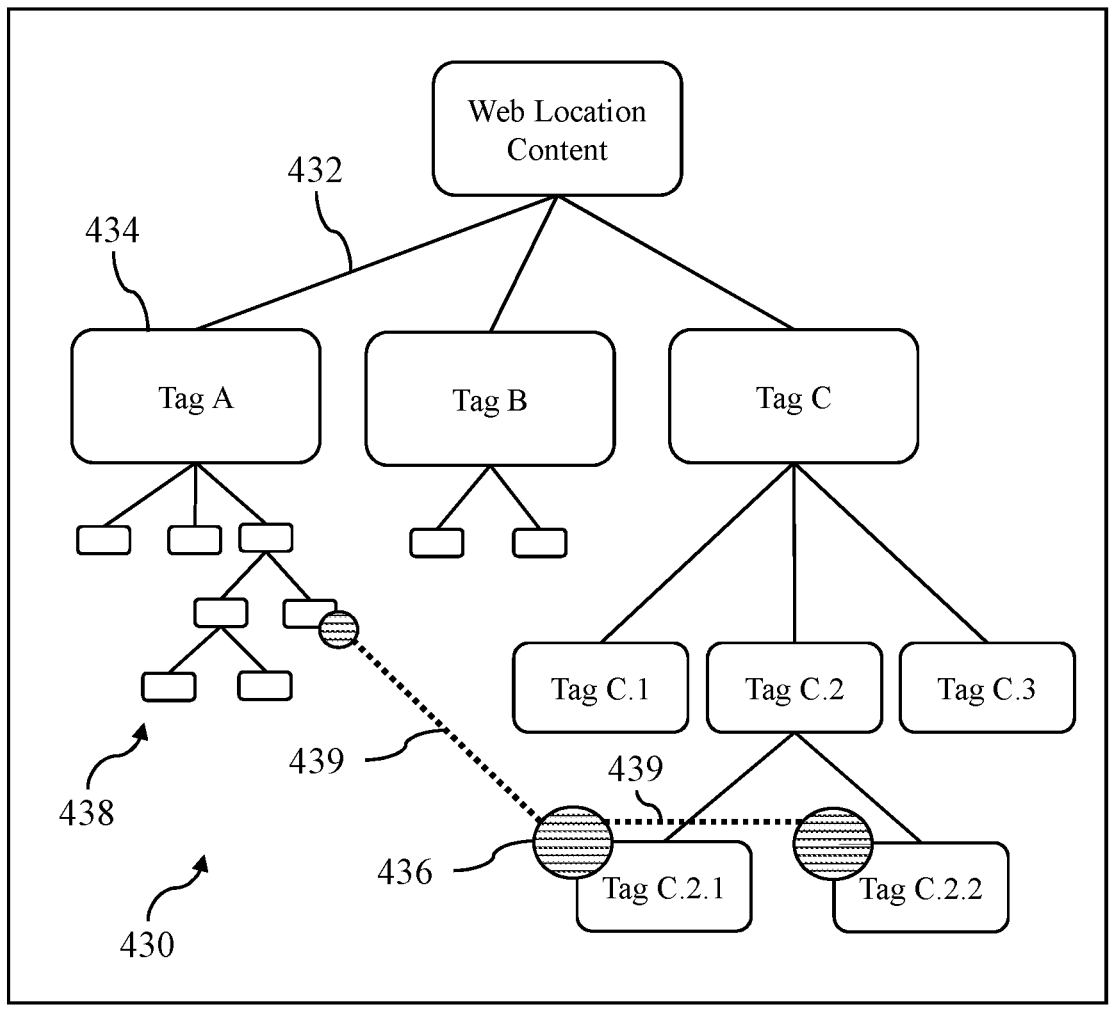
FIG. 5A is an illustration of an exemplary interface for displaying and interacting with data generated by the steps of FIG. 4.
FIG. 5B is an illustration of an alternate exemplary interface for displaying and interacting with data generated by the steps of FIG. 4.

After processing all web content and tags, and storing context (416) for tag executions and cookie state changes, the system may generate (420) and display (422) a report that describes or illustrates the various detected state changes, as well as their impact, source, and other characteristics. The report may include various textual and image descriptions, and may also include various interface elements (e.g., buttons, hover-over windows, clickable elements, menus) to aid in navigating the descriptions and viewing additional and/or different views of the data. FIGS. 5A-5D each show examples of interfaces that may be displayed by or with the report. FIG. 5A shows a tree map (430) of example output from the report. The tree map (430) originates from a node that represents the original content and/or source of the web content, which may be, for example a URL for domain rom which the content was received (e.g., www.website.com/home). A number of tag nodes (434) branch from their parent (e.g., either the origin URL or a parent tag which includes or invokes them) via connecting lines (432), and each tag node (434) may include additional child nodes (438) that branch therefrom, representing additional invoked tags. In this manner, the tree map (430) provides a graphical illustration of the hierarchy of tags executing at a particular URL or domain. Such a graphical representation provides helpful information at a glance which may be used to refine the structure of a website. For example, it may be desirable to limit the depth of branches of the tree map (430) to four levels, to reduce load times and control the complexity of sub-tag invocation schemes.

Information related to cookie inspection and monitoring may also be displayed with and/or accessed through the tree map (430). For example, a graphical icon (436) of a particular shape, color, image, or other visual element may be displayed on any tag node that caused a cookie state change (e.g., created, wrote information to, or read information from a cookie). Hovering over or clicking on a particular icon (436) may provide further information on that script, the associated cookie, or both. The tree map (430) may also include shared lines (439) that connect one or more icon (436) across different nodes, to indicate that different tags are creating, accessing, or modifying the same cookie (e.g., several tags executed on a website may each create, modify, or access a single cookie with an email address value). Such a representation may be useful to identify undesirable cookie activity, such as where tags with unrelated purposes, or from unrelated sources, appear to be sharing cookie use, which may be undesirable (e.g., in contrast to the shared line (439) between Tag C.2.1 and C.2.2, which each are invoked by Tag C2, and so may be related and/or expected cookie sharing). FIG. 5B shows another visual representation of a tag hierarchy similar to the tree map (430). A trace map (440) displays hierarchical information by the order and spatial relationship between different rows, and may otherwise function similarly to the tree map (430) by providing graphical icons (442) indicating cookie activity, shared lines, clickable elements, hover over windows, and other controls.

FIG. 5C shows a cookie context summary (450) window which may be displayed with any other interface (e.g., as a separate pane, a hover over window, a pop up window, or other interface element). The cookie context summary may display information previously determined and saved (416) by the system that is descriptive of the cookie activity that was detected. Information will vary, but may include a description of the state change (e.g., created, modified, accessed), the key or name of the cookie, the value of the cookie, the identity of the tag which caused the cookie activity, the manner in which the cookie was set, the origin, URL, or other identifier for the source of the tag that caused the cookie activity, various other attributes or characteristics of the cookie such as whether it requires a secure connection (e.g., https://), whether client side access to the cookie is restricted, whether the cookie should be restricted to use on a particular site or domain, and a date that the cookie will expire on. Each element of the cookie context summary (450) may be interactive such that, for example, a user may click on the setting tag name to view further information on that tag, or other cookie activity caused by that tag, or click on the cookie setter URL to see other cookie activity originating from that source.

FIG. 5D shows a cookie report selection (460) which may be displayed with any other interface (e.g., as a separate pane, pop up window, or other element). The cookie report selection (460) may provide a number of selectable buttons or options to cause additional report lists to be generated and displayed with a single click, with each report being based on previously collected data (416). Examples of report views that may be selected and switched between include a list of each unique cookie activity origin and a sum of cookie activity from that origin (e.g., www.website.com created 12 cookies on page load), a list of each unique tag and a sum of cookie activity from that tag (e.g., Tag C.2.1 created 12 cookies on page load), a list of cookies by expiration date length (e.g., Cookie C.2.1.A expires in 12 months from set date), a list of cookie activity that occurs unconditionally (e.g., Cookie C.2.1.A will be created regardless of user consent, privacy, or account settings, as may be determined by the lack of conditional logic around incorporating the source tag or creating the cookie), a list of cookies that appear to contain plaintext PII (e.g., Cookie C.2.1.A value is "example@email.com"), a list of cookies with certain characteristics (e.g., all cookies where SameSite attribute=false), and other reports or views.

III. Parameter Risk Level Assessment

Figure 6A:
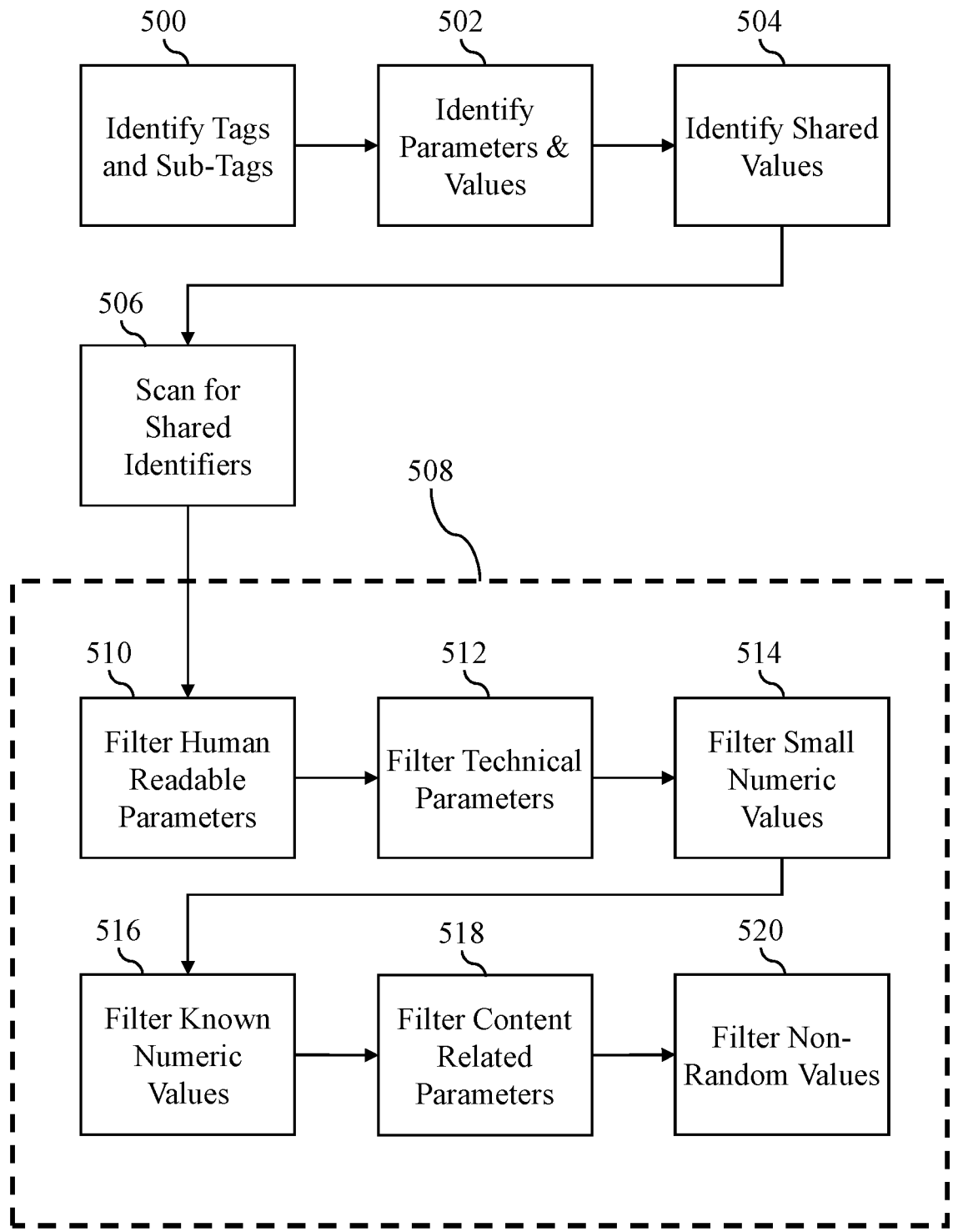
FIG. 6A is a flowchart of an exemplary set of steps that may be performed with the content inspection system of FIG. 1 to identify risks associated with encoded, shared web parameters.

As has been described, the content inspection system (100) is capable of monitoring tags, cookies, or both in order to identify the context and characteristics of such activities that may be beneficial for web content managers in identifying various issues with web content. Such content inspection, whether as part of tag and cookie context inspection or not, allows for the implementation of additional beneficial features. As an example, FIG. 6A shows a set of steps that may be performed with a system such as the content inspection system (100) to identify risks of web parameters that are associated with tags, cookies, or both. A web parameter generally describes a piece of information that is used in a global or page-specific context during a web browsing session that spans across a number distinct URLs, on a single domain or across multiple domains. Parameters may be passed via URL (e.g., www.example.com/signin=true), stored in an active web document, or saved to cookies or other cached memories, for example.

While parameters are often used to store or pass simple data or technical flags that influence the operation of a web page, they can also be used by third parties to capture information from a user session and direct it elsewhere (e.g., such as a script that executes on a page to capture any text typed into text input boxes anywhere on the page, and transmit that captured information to a remote source), often as part of user tracking and advanced marketing where a sophisticated tracking system can observe an initially anonymous user's activities across multiple web pages and, over time, develop a frighteningly accurate profile for the user that sometimes includes PII such as a name and physical address. With the complexity of modern web content, and the variety of useful third party services and features that may be added to a page with a single tag, it quickly becomes impossible for a web developer to track and understand all of the parameters at play on any given web location This is especially true when the tag that is harvesting user information encodes the information so that it is not readily identifiable as PII (e.g., an email address may be hashed to an encoded string such as 5658FFCCEE7F0EBFDA2B226238B1EB6E).

To begin the process of identifying parameter risk, the system may identify (500) the tags and sub-tags that are associated with web content from a web location, and that are executed when loading that web content, as has been described (e.g., with reference to FIG. 4, this may include steps such as receiving (404) content, monitoring (406) tags, executing (408) tags, analyzing (410) cookies, and so on). While identifying (500) tags, the system may identify (502) any parameters and their values that are associated with any executed tag. This may include parameters that are passed between tags or scripts, parameters transmitted to remote sources, parameters written to cookies, parameters passed via URL, and parameters stored in the document itself, for example. With a list of parameter and value pairs, the system may identify (504) any parameters that are shared, meaning that they are associated with the activities (e.g., setting the parameter, reading or receiving the parameter, modifying the parameter) of at least two distinct tags. This could include two distinct tags that use the same parameter name (e.g., ipAddress), the same parameter value (e.g., 123.123.123.1), or the same parameter and value pair (e.g., ipAddress=123.123.123.1). Such shared parameters may be identified even where fully or partially encoded (e.g., such as ipAddress=9B32ABC69F3AF2C9CFA97F8C752A5413 where the value is encoded, or p1=90079C34BE950EE46BB2A6B8EABB6307 where the entire key-value pair is encoded and passed by an arbitrary parameter name "p1").

From the set of shared values (504), the system may then scan for any shared values that could also be identifiers (506). This could include identifying any PII that is not encoded and is present in a shared value (e.g., email=email@email.com). While this could identify (506) any plaintext PII, it may fail to identify any identifiers that are encoded in some manner, or are otherwise not readily determinable as identifiers. Some identifier parameters may be arbitrarily assigned identifiers, such as a unique user identifier number or string that might be used by a web tracking platform. As an example, a web tracking platform that tracks user activities across a plurality of websites using scripts injected into those websites might assign each "distinct" user an arbitrary number or string identifier that can be used as a primary key for information stored about that user, regardless of the website or other source from which the information is gathered.

In order to identify encoded identifiers, the system may apply one or more filters (508) to the set of shared values (504) in order to remove any values that are unlikely to be encoded identifiers. Filters applied will vary, but may include filtering (510) out any human readable text such as words, proper nouns, sentences, or composite words, which may be performed using a natural language processing method or dictionary set. This step might exclude shared values that have some page specific meaning, such as a search term or user preference, but are unlikely to be a unique user identifier used across multiple scripts.

Another filter might include filtering (512) out any shared values that appear to be technical data used to provide the web content. This might include shared values that are URLs, encoded search strings, encoded user preferences, or other technical information whose source or use within the web content is known, or apparent from the context. Another filter might include filtering (514) out any small numeric values (e.g., less than 5 digits), since such numbers are unlikely to be unique identifiers due to the relatively small number of identifiers possible between the minimum number and maximum number (e.g., 0000 through 9999). Another filter might include filtering (516) out, or classifying differently, any known numeric values, which might exclude, or classify differently, numeric values such as zip codes, IP addresses, descriptions of currency amounts, or unique user IDs that originate from the web content itself and not a tag (e.g., such as a user ID that originates on the web site itself, rather than originating from a tracking platform). If a known numeric value is also PII, it may simply be flagged as such, and not further analyzed to determine if it is an encoded identifier.

Another filter might include filtering (518) out any parameter values that can be linked to the web content itself, such that it can be determined that the parameter is related to content on the web page rather than a third party tracking platform or other tag. As an example, where web content is for a list of products available to purchase on a website, each product might be assigned a unique identifier that is used as a primary key for that product, and which may be present in the web content and elsewhere. By filtering out such identifiers that are found within the content itself or are introduced by a tag that originates from the web content provider itself (e.g., a company that owns/operates the website that is being inspected), these identifiers will not be mistakenly flagged as risky third party identifiers. Another filter might include filtering (520) out any numerical or string values that appear to be non-random values, as encoded identifiers and other identifiers will generally appear to be random values. As an example, a string value such as 12345678910111213, ABC123DEF456, or AAA190u123418hBBB might avoid being filtered by other filtering processes, but is extremely unlikely to be an encoded value due to the patterns, repetitions, or non-random sequences of characters present in the string.

Figure 6B:
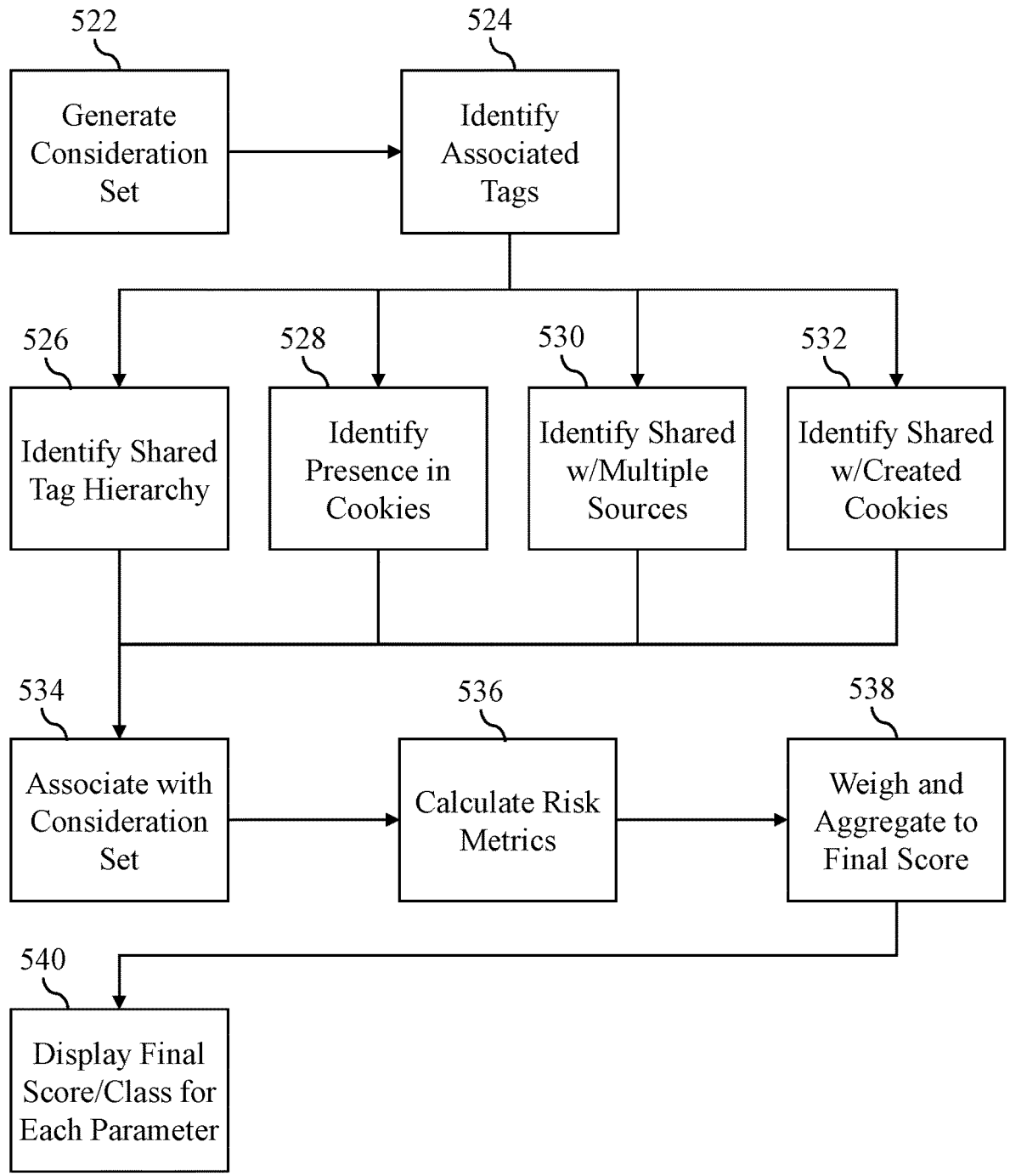
FIG. 6B is a flowchart of additional exemplary steps that may be performed with the content inspection system of FIG. 1 to identify risks associated with encoded, shared web parameters.

The remaining set of shared parameter values, which may include values that are likely to be unique identifiers, whether encoded or not, or may include plaintext PII, or both, may be used as a consideration set for subsequent risk assessment steps. Turning now to FIG. 6B, once the consideration set is generated (522), the system may, for each parameter in the consideration set, identify all the tags that are associated with that parameter (e.g., any tag that receives, passes, sets, or modifies the parameter). Through analysis of the associated tags, the system may identify (526) whether any of those tags have a shared tag hierarchy (e.g., with reference to FIG. 5A, Tag C.2.1 is a child of Tag C.2, and tag C.2 is a child of Tag C). A shared tag hierarchy may indicate a higher risk associated with the shared parameter, while parameter sharing outside of any tag hierarchy may indicate a lower risk (e.g., with reference to FIG. 5A, the shared line (439) connecting Tag C.2.1 to a descendent of Tag A may indicate a lower risk for that shared parameter).

The system may also, for each parameter and any associated tags, identify (528) whether that parameter is stored in an associated cookie or other storage location. The presence of the potential identifier within a cookie may indicate a higher risk for the parameter, since it may follow the user to other websites and persist between sessions, while the absence of storing the potential identifier within a cookie may indicate that it is used for a low risk purpose.

The system may also, for each parameter and any associated tags, identify (530) the number of unique sources or third parties that the parameter is shared with or accessed by, as indicated by the number of associated tags and their origin. As an example, with reference to FIG. 5A, where Tag C, Tag C.1, Tag C.2, and Tag C.3 are each associated with a different origin source or entity (e.g., either determinable by the URL or web location from which the tag is retrieved, a URL or web location that the tag transmits data to, or as classified in a database that describes tags and their origins), the system may determine that a particular parameter used by all four of those tags is shared between four sources, which may represent a high risk parameter.

The system may also, for each parameter and any associated tags, identify (532) any cookies that are set by tags that are sharing parameters. Continuing the above example where Tags C through C.3 are each have different origins, and where Tag C creates a cookie including that parameter, this may represent a high risk parameter.

The determined (526, 528, 530, 532) information is associated (534) with the corresponding parameter of the consideration set, and the system uses the information to calculate (536) a set of risk metrics for each parameter in the consideration set, based on the associated information. Calculating risk for parameters that are potential identifiers, whether encoded or not, may consider the information determined (526, 528, 530, 532) previously, and may also take into account information such as the number of distinct pages or instances, across a website, where different sets of parameter values are paired with the potential identifier (e.g., received with the potential identifier, provided to a recipient with the potential identifier, associated with a cookie that stores the potential identifier, etc.), as this may indicate numerous different types of information being associated with a single unique identifier. A high number of pages or separate parameter values all being associated with a potential identifier increases its risk and the likelihood that it is an identifier.

This risk calculation may also consider the number of distinct tags that share the parameter via a tag or script hierarchy (e.g., such as a parent script that calls a child script, and passes the shared parameter on to the child script). Where most or all of the tags that share the parameter are within the same hierarchy, this may indicate a high risk that it is an identifier. This risk calculation may also consider the number of distinct tags that share the parameter via a cookie or other mechanism outside of tag hierarchy. Where most or all of the tags that share the parameter do so outside of a tag hierarchy, this may indicate a higher risk, and a high likelihood that it is an identifier. The risk calculation may also consider the number of distinct that share the parameter via both cookie and a tag or script, which may indicate a higher risk, and a high likelihood that it is an identifier.

This risk calculation may also consider the total number of tags that share the same value as the parameter value, whether such value is associated with the same parameter key or not (e.g., p1=12345678 and p2=12345678 have different names or keys, but share the same value), which may indicate a higher risk, and a high likelihood that it is an identifier. This risk calculation may also consider the number of distinct sources from which tags that share the parameter come from, with a high number of sources indicating a higher risk, and a high likelihood that it is an identifier, while a low number of sources indicates the opposite.

This risk calculation may also consider the total number of pages that have the same parameter values shared through both tags or scripts, and cookies, and the total number of pages that have the same parameter name or key used, with a high number of pages indicating a higher risk for the parameter, and a high likelihood that it is an identifier, while a lower number indicates the opposite.

This risk calculation may also consider, where the parameter is stored in a cookie, the source or entity that sets the cookie. As an example, where the cookie setter is the owner of the web content, there would be a low risk. Conversely, where the cookie setter is a known entity that provides web tracking of users, the parameter would be associated with a high risk, and a high likelihood of being an identifier.

The various risk metrics calculated (536) for each parameter in the consideration set may be determined as Boolean values (e.g., cookie set by web content owner=true/false), numbers (e.g., parameter shared across 10 pages), or other concrete values. The system may use such values to weigh, aggregate, and assign scores or score classifications for each parameter in the consideration set that may be used to display a report that describes parameter risk across a website or domain. Weighted values may be adjusted and configured as desired, such that each user or instance of the system may develop its own risk criteria (e.g., a Banking website may have a lower risk threshold than a sports discussion forum for certain types of parameter sharing). Aggregate scores may be presented as numbers (e.g., a score between 1 and 100 with a higher number indicating greater risk), colors (e.g., green, yellow, red), text (low, medium, high), or other distinctive visual or textual representations. In some implementations the scores may be aggregated to provide both a risk, as well as a likelihood that the parameter is a unique identifier (e.g., an indication that a parameter would be high risk as an identifier, but there is only a moderate chance that it is actually an identifier).

Figure 7:
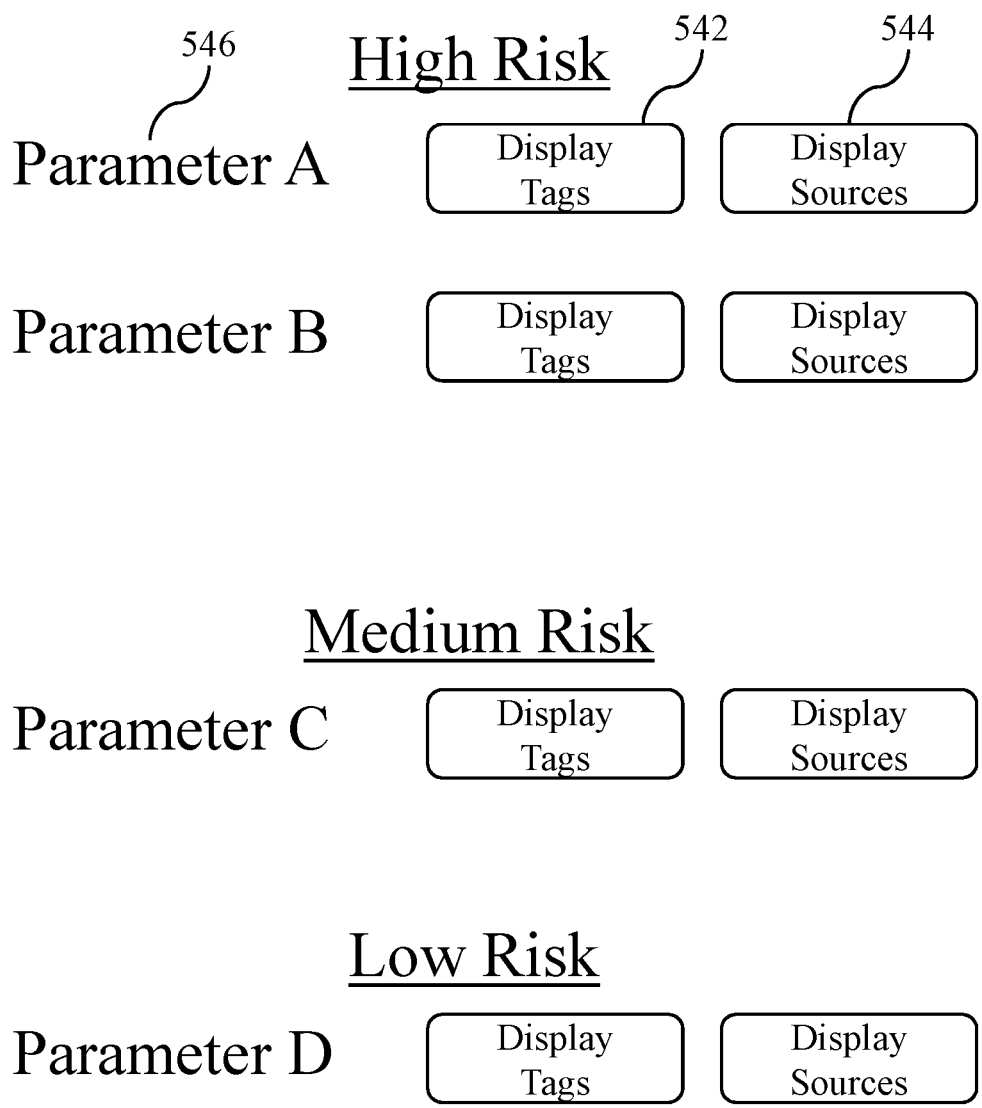
FIG. 7 is an illustration of an exemplary interface for displaying and interacting with data generated by the steps of FIGS. 6A and 6B.

FIG. 7 shows an example of an interface for displaying and interacting with parameter risk assessment data, such as that described above. In the shown example, the parameters are identified and listed out within different risk categories. As with prior interface examples, the interface may provide various interactive elements such that a user can hover over or click on the parameter name to see additional information, such as a pop up window that displays the underlying risk score, risk metrics, and other determinations from which the high risk assessment has drawn, and may also display other parameter characteristics such as the varying keys, values, or key-value pairs to which it is associated. Each parameter may also be paired with additional buttons or interface elements that a user may interact with to view additional data or views, such as a tag display button (542) that may display information describing any tags that use the parameter (e.g., in the form of the tag map (430) or trace map (440) previously shown, with relevant portions highlighted or linked to each other, or in other forms). Another interface element may be a display source button (544), that may be clicked to display a list of sources from which tags that use the parameter originate, which may be displayed as a list, table, or in other forms.

IV. Personally Identifiable Information (PII) Monitoring

Figure 8A:
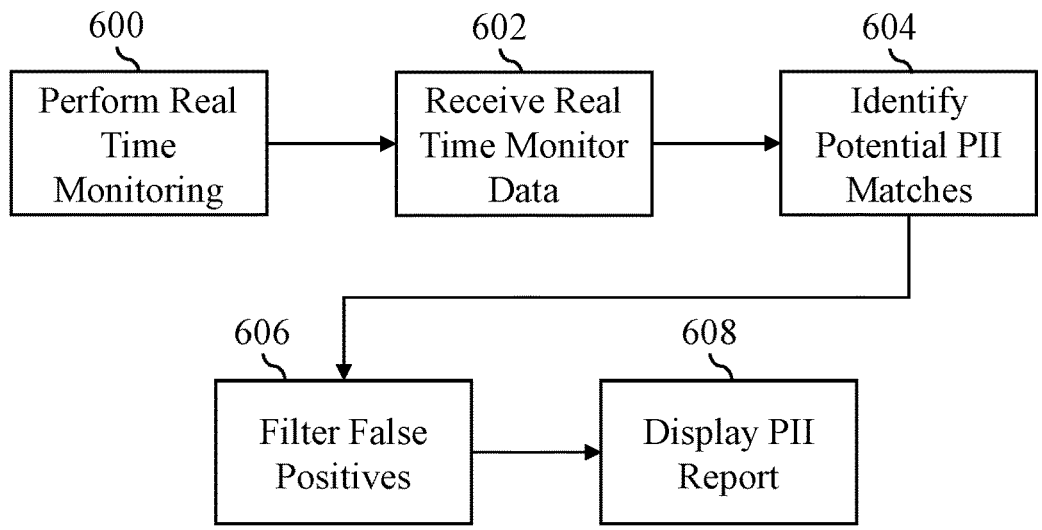
FIG. 8A is a flowchart of an exemplary set of steps that may performed with the content inspection system of FIG. 1 to identify the use of personally identifiable information (PII) within web content.

There has been some discussion of inspecting tags, cookies, and other portions of web content and related content for PII, both in plaintext format, and encoded formats. The content inspection system (100) is capable of providing additional PII monitoring features, for example, FIG. 8A shows a set of steps that may performed by a system such as the content inspection system (100) to automatically identify and verify the use of PII within web content. While some or all of the features described herein may be performed using either server side inspection and monitoring techniques, or real time inspection and monitoring techniques, as described above, PII monitoring may especially benefit from implementation as a real time system shared between the server and client devices, as this will help to provide and test a variety of web content access scenarios across a plurality of users, which may be difficult for a server side implementation to rigorously simulate.

A plurality of users may access web content at a website or domain that is configured for real time monitoring (600), with each user session providing various real world monitor data based on their own unique interactions with the web content. This real time monitor data is received (602) by the system, and may be used to provide various features as described herein (e.g., cookie inspection, parameter risk analysis, etc.). Real time monitor data may include information that identifies (604) potential PII matches within the web content, as well as its associated tags and cookies, or may include information that is usable by the server to identify (604) such potential PII matches. With various potential PII identified (604), by the system or the client device, the system may then apply one or more filtration and validation processes to filter (606) false positives from the potential PII. Once filtered (606), the system may then generate and display (608) a PII report that identifies the instances and context of PII being received, transmitted, or otherwise used by tags, cookies, or other web content.

In some implementations, identification (604) of the potential PII may be performed on the client device, in real time as the user browses and interacts with the web content, by execution of a script or application provided to the client device. The client device may be configured to scan web content as it is received, interpreted, and/or executed for plain text representations of PII and, where matching text is identified, may provide that plaintext PII, as well as the context in which it was identified within the web content (e.g., html, script, tag, cookie or other web content) to the server for further filtering and analysis (606). As one example, the client device may be configured to perform a variety of regular expression searches across the web content, when it is received and as it is modified by user actions or subsequently loaded scripts or tags, in order to identify potential PII. In some implementations, identification of potential matches may instead be performed by the server, with the client device providing the monitor data to the server in the form of selections of web content such as tags, cookies, and parameter values.

Whether by the client or server, information that is searched for may include, for example, any plaintext parameters or other values that match the general structure of a name (e.g., 2 or more proper nouns, an abbreviated middle initial, prefixes or suffixes), phone number (e.g., 7-10 numbers continuous, or separated by various special characters), email address (e.g., text strings separated by the @ symbol and a period), social security number (e.g., 9 digit number continuous, or separated by various special characters), credit card or other payment information number (e.g., 16 digits continuously or separated), street address (e.g., combination of number and text string paired with Ave., St., Rd., or other information), IP address (e.g., 4-12 digits continuously or separated), or other PII.

Figure 8B:
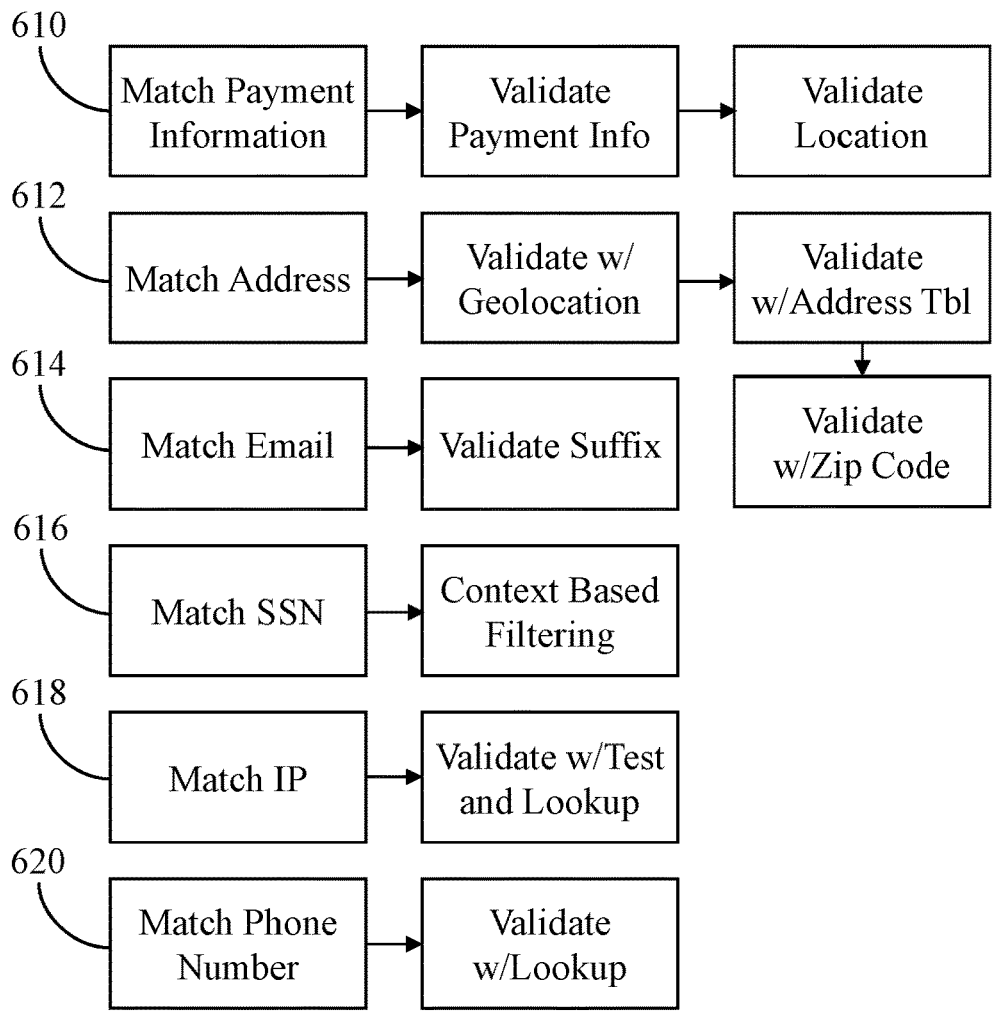
FIG. 8B is a flowchart of additional exemplary steps that may be performed with the content inspection system of FIG. 1 to identify the use of personally identifiable information (PII) within web content.

More advanced filtering (606) may then be performed on these potential matches, such as is shown in FIG. 8B, which shows a number of additional validations that may be performed depending upon the type of PII that is potentially matched. Where the potential match is for payment information (610), the system may validate the payment information using various methods. As an example, for credit card payment information, the system may utilize an algorithm such as the Luhn algorithm to verify the validity of the sixteen digits. For banking information, the system may verify routing numbers or other information via a query or search of a routing number database or service. The system may also perform location based validation of the payment information based on a geolocation of the user's IP address. As an example, credit card numbers include certain sequences or patterns of numbers that suggest the geographic location of the card holder, and that may be extracted from the payment card information and validated against the IP geolocation. Where either of the above validations fails, the payment information may be filtered out as a false positive, or displayed (608) on the report with a cautionary flag or request for manual review.

Where the potential PII match is for a street address (612), the system may validate based on geolocation of the IP address, as has been described, may validate the street address by query to an address table or mapping API (e.g., a third party map service that can return matches for searched street addresses) to verify the existence of the address, and may validate the address against a zip code or other related information that is also present within the content. Where some or all of the validations fail, the system may filter as a false positive, or may display the PII in the report with a cautionary flag or request for manual review.

Where the potential match is for an email address (614), the system may parse the address to extract the email suffix (e.g., @example.com) and verify both portions of the suffix by querying an email address table or email domain API (e.g., a third party service that confirms whether an email address suffix resolves to a valid recipient). As with prior examples, false positives may be filtered, or presented with caution or additional review.

Where the potential match is for a social security number (616), the system may perform context based filtering using other web content from the same web location. As an example, where the web site or web location from which the potential SSN originated does not include any text input boxes that request or receive SSN inputs, or where the web location uses 9 digit identifiers to describe products, html elements, or other aspects of the web content, such potential PII may be filtered as a false positive, or displayed with caution or review.

Where the potential match is for an IP address (618), the system may validate the IP address by querying an IP address lookup service or API to determine whether an IP address within that range may be granted by any internet service providers within the geographic area of the user, with IP addresses that fail such validation being filtered as false positives, or presented with caution or review.

Where the potential match is for a phone number (620), the system may validate the phone number to ensure that the area code and other number sequences are valid and resolve to geographic areas, and may also validate by lookup or query to a service or API that verifies whether phone numbers are active or in service, with phone numbers that fail such validation being filtered as false positives, or presented with caution or review. One or more of the above validations may also be combined with each other in some cases, such as validating the area code of a phone number against the street address, credit card location identifier, or IP address geolocation.

Figure 9:
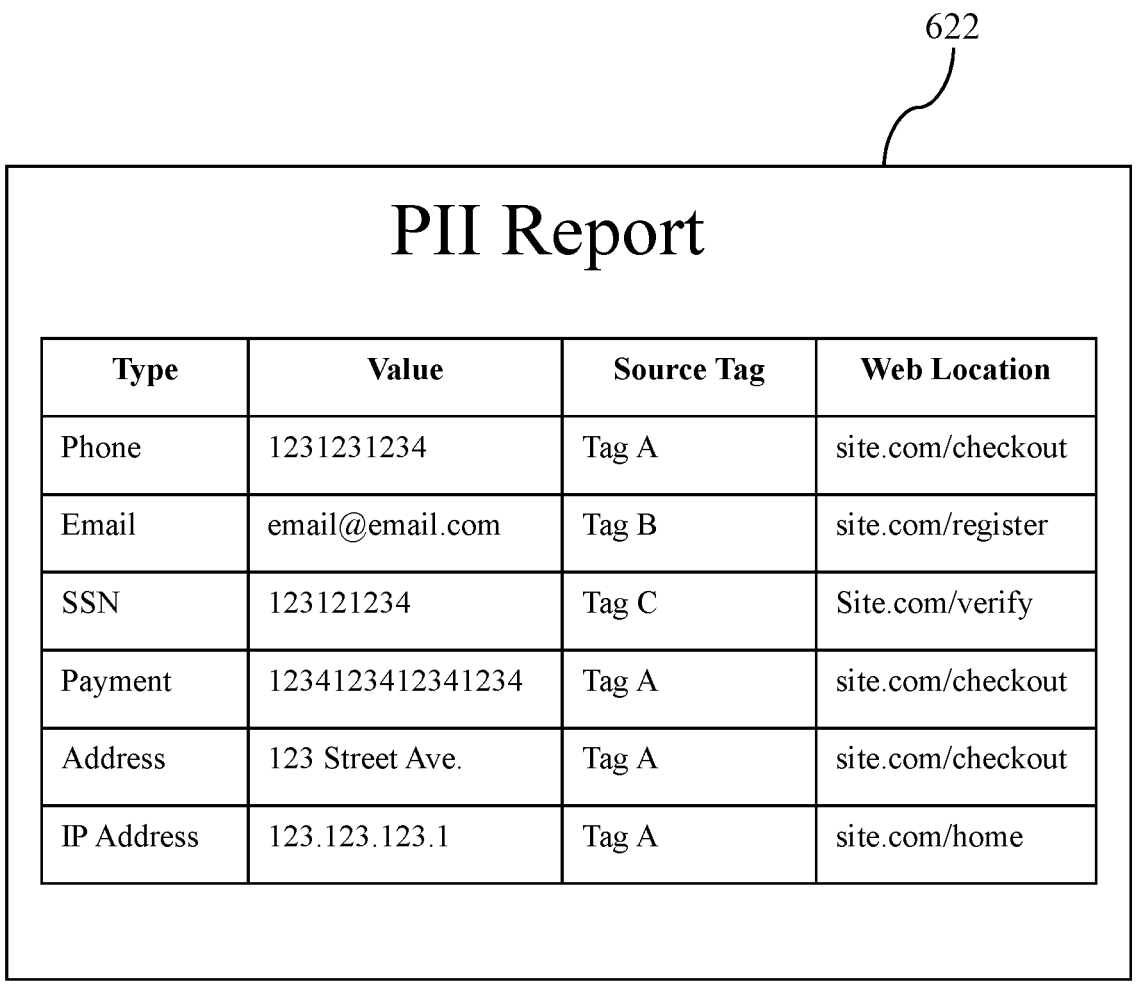
FIG. 9 is an illustration of an exemplary interface for displaying and interacting with data generated by the steps of FIGS. 8A and 8B.

FIG. 9 shows an example of an interface for displaying and interacting with PII data that has been automatically identified and not excluded by filters or validation, as described above. A PII report (622) may be displayed as a list, table, or other format that shows varying information related to the context in which the PII was present in the web content. As an example, in FIG. 9, each instance of PII is classified by its type (e.g., phone, email, SSN), the value is displayed, allowing for quick manual verification, the source tag (e.g., the tag which received, transmitted, accessed, or stored the PII within the web content or a cookie), and a web location at which the PII instance occurred (e.g., a URL or other web location at which the PII was first detected within the web content). As with other interface examples, portions of the PII report (622) may be interacted with to view or display additional data, such as by clicking on a source tag to see where that tag exists within the tree map (430) or trace map (440), or by clicking on the web location to see other tags or information associated with the web content at that location.

V. Consent Simulation

Figure 10:
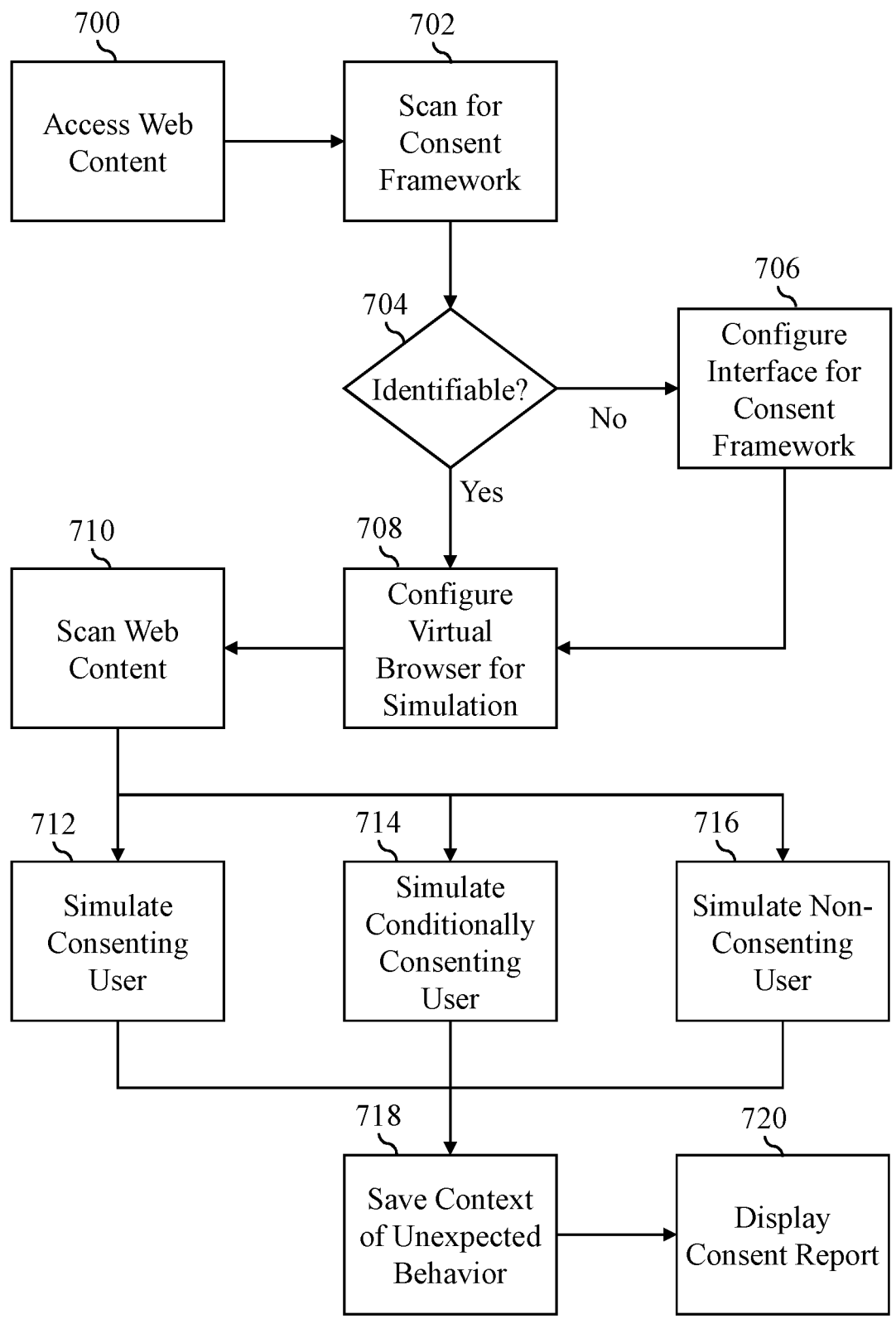
FIG. 10 is a flowchart of an exemplary set of steps that may be performed with the content inspection system of FIG. 1 to verify the operation of consent controls within web content.

Some implementations of the content inspection system (100) may also be configured to verify the operation of consent features within web content, which are used by many websites to control the experience of visitors to a website based upon their configured account settings. This may include opt-in/opt-out of third party advertising, behavior tracking, and other aspects of web browsing that may privacy concerns. Many websites implement these consent features through a consent management platform, which is a third party system and service that integrates with the existing web content (e.g., typically by inclusion of a tag or other script, as well as various content hooks) in order to automatically control the operations of consent based features on the website. These consent management platforms require specific configurations in order to function and provide the expected consent based behavior of scripts, tags, and other web content, and so there is a risk of erroneous implementation, or subsequent web content modifications breaking a prior implementation, such that users experiences no longer match their consent settings. FIG. 10 shows a set of steps that may be performed with a system such as the content inspection system (100) to verify the operation of consent controls within web content. Such steps may be performed as part of other monitoring or inspection, or may be performed independently. While FIG. 10 describes the steps as performed by a server side implementation (e.g., through a virtual browser), it should be understood that the same or similar steps may also be performed through a real time implementation, as has been described.

Once configured, which may include identifying a URL, domain, or set of URLs on which to verify consent features, the system may access (700) web content associated with those locations, which may proceed as described in the context of FIG. 4 (e.g., receive (404) content, monitor (406) tags, execute (408) tags, including sub-tags). As web content is accessed and received, the system may scan (702) the web content in order to identify a consent framework that may be implemented with the web content. Scanning (702) to identify a consent framework may include, for example, identify particular tags, or tags associated with particular origins, that are implemented in the web content. As an example, some consent management platforms may require that a tag be implemented on the managed website that, when executed, may obtain additional tags from a remote server associated with the platform. Scanning (702) may also identify other web content hooks, parameters, scripts, or other structures associated with the consent management platform. As an example, some consent management platforms may set certain parameters in the document, in cookies, or in URLs that allow an executed tag to interact with the web content in a predictable manner. The tags, hooks, or other web content associated with the consent platform may be identified using a database or software application configured to store characteristics about certain consent platforms, such that a tag or hook may be identified as associated with a certain consent platform based upon a text match, filename match, web location match, file size match, checksum match, or other match.

Where a consent management platform is not identifiable in the web content (704), the system may be used to configure (706) a new interface for the consent network so that it may subsequently be identified. This may be performed manually, by a user inspecting the website, identifying the consent management platform, and configuring the database or software application to store details usable to identify and interact with the consent management platform. This may also be configured (706) automatically, by searching the web content for interface elements related to opt-in/opt-out settings (e.g., this may include text, checkbox inputs, and other elements in a registration form, user account management form, or other portion of web content), and identifying any related parameters or conditional logic that are associated with each different consent state (e.g., opt-in, opt-out, partial opt-in, etc.). By identifying associated parameters and conditional logic, the system may be able to identify the tags, hooks, or other web content elements related to the consent management platform, and automatically generate the configurations necessary to influence and observe the behavior of that platform.

Once the system is able to interact with the consent management platform (e.g., directly or indirectly), the system may configure (708) one or more instances of a virtual browser to simulate the various consent settings that are available for the web consent. For example, for a website that includes a single opt-in/opt-out consent feature that controls various portions of the web content, two virtual browser sessions may be configured (708), one to access the web content while overriding or otherwise controlling the session to simulate a session where the user has opted in, and one to simulate a session where the use has opted out. During each simulation, the system may store the context and results of the session that relate to consent, such as tags that do or not execute in each simulation, cookies that are or are not created in each simulation, and parameters that are or are not set or used in each simulation.

Once configured (708), the system may scan (710) the web content with each simulation, in series or in parallel. The different types of simulation will depend upon the number and types of consent that may be managed within particular web content, but in some implementations the simulations will include simulating (712) a consenting user, simulating (714) a conditionally consenting user, and simulating (716) a non-consenting user. Conditional consent to some activities might include, for example, consenting to certain tag, cookie, parameter, or other web content activity related to on-site personalization but not consent to activity related to advertising. For each simulation, the system will identify (718) any unexpected behavior, such as execution of tags, or creation of cookies during a non-consent simulation, and will save the context of that occurrence (e.g., the related web content, tag, cookie, parameter, web location, etc.). The system may then generate and display (720) a report based on the simulation data, which may include identifying the results of each simulation, or identifying the unexpected behavior detected during each simulation.

Figure 11:
FIG. 11 is an illustration of an exemplary interface for displaying and interacting with data generated by the steps of FIG. 10.

FIG. 11 shows an example of an interface for displaying and interacting with data generated by the simulated consent scenarios. A consent report (722) may include a list, table, or other form of data that identifies unexpected behavior resulting from one or more consent simulations. Information shown may include the type of simulation in which the behavior occurred (e.g., full consent, conditional consent, non-consent), the type of unexpected behavior (e.g., expected tag failed to execute, expected cookie failed creation, unexpected tag executed, unexpected cookie created), a tag, cookie, or other web content related to the behavior (e.g., identification of a tag that unexpectedly executed, a cookie that was unexpectedly created, or both), and a web location where the unexpected behavior occurred (e.g., a URL or other location). As with other interfaces described herein, portions of the consent report (722) may be interacted with by a user in order to view additional information or views. As an example, the source tag may be selected in order to see that tag or cookie within the tree map (430) or trace map (440), or the web location may be selected in order to see any other consent issues, PII issues, or other monitored issues associated with that web location.

VI. Miscellaneous

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

It should be appreciated that the steps described and claimed herein may be performed in an order or sequence other than that in which they are introduced, and may also be performed in series or in parallel. No part of this disclosure should be interpreted to be an express or implied restriction of the performance of steps to a certain order, except where such an order is strictly necessary for the functioning of the step (e.g., such as a subsequent step that can only be performed using the output of a prior step), or where such an order is described as having a particular benefit as compared to any other order. No label, arrangement, organization, or reference number used in this disclosure or the claims should be interpreted to be an express or implied restriction to a certain order, and for the sake of clarity this exclusion applies to at least the order in which the drawings are introduced, the order in which steps are performed in the drawing, the order in which reference numbers are used in relation to steps, the order in which different sections of this description are introduced, indentations or spatial organization within the claims, or non-substantive labeling within the claims (e.g., organization of separate steps into separate lines labeled (a), (b), (c) . . . ).

The invention claimed is:

1. A method for web content inspection comprising, by a processor:
    (a) setting a reference point that describes a state of a browser storage location, wherein the browser storage location corresponds to a location of a file system of a storage device in communication with the processor, and the browser storage location is configured to receive session data from a web content processor;
    (b) receiving a set of web content that is associated with a web location;
    (c) interpreting the set of web content with the web content processor by:
        (i) autonomously executing each tag of a plurality of tags within the web content; and
        (ii) where execution of any tag of the plurality of tags incorporates a sub-tag, adding that sub-tag to the plurality of tags;
        where the web content processor sends session data related to the execution to the browser storage location;
    (d) monitoring the execution of each tag of the plurality of tags by:
        (i) determining whether execution of that tag affects the state of the browser storage location relative to the reference point; and
        (ii) where the browser storage location is affected, generate a browser storage event that describes that tag and any impact on the browser storage location;
        (iii) monitoring for the presence of one or more high-risk parameters within the browser storage location, wherein a high-risk parameter is a parameter that is found among one or more tags or one or more cookies, indicating that the parameters may be a shared identifier of a user; and
    (e) generating a web content inspection report that describes, for each of a plurality of browser storage events associated with the web location:
        (i) a source tag that affected the browser storage location;
        (ii) a change in the state of the browser storage location caused by the source tag; and
        (iii) the one or more high-risk parameters.

2. The method of claim 1, wherein the browser storage location is a cookie repository, the web content processor is a virtual browser, the plurality of tags include one or more scripts that are executable by the web content processor, and the effect on the browser storage location is at least one of creating a cookie, accessing the cookie, or modifying the cookie.

3. The method of claim 1, further comprising displaying the web content inspection report to a user device, wherein the web content inspection report includes:
    (a) a tag hierarchy that visually illustrates relationships between two or more tags in the plurality of tags;
    (b) a visual marker for any tag of the plurality of tags that is the source tag, wherein the visual marker indicates at least one feature of the change in the state of the browser storage location caused by the source tag.

4. The method of claim 1, further comprising identifying a set of sharing tags within the tag hierarchy, wherein each tag of the set of sharing tags affects a same shared data in the browser storage location, and wherein the web content inspection report further includes one or more share markers that visually associate the set of sharing tags with each other.

5. The method of claim 1, wherein the web content inspection report includes, for each of the plurality of browser storage events, a set of cookie data that describes a cookie name, a cookie value, a cookie set method, a cookie setting tag name, a cookie setter URL, and a cookie expiration date, and wherein executing any tag includes simulating the execution of the tag.

6. The method of claim 5, wherein the web content inspection report further includes a list of cookie setters and a number of cookies set by each, a list of setting tags and the number of cookies set by each, and a list of cookies that include personally identifiable information.

7. The method of claim 1, further comprising:
    (a) identifying a set of shared values that are:
        (i) added to the browser storage location by the plurality of tags, or configured within a browser session by the plurality of tags; and
        (ii) affected by two or more tags of the plurality of tags;
    (b) identifying a set of shared identifiers within the set of shared values, wherein each of the set of shared identifiers includes characteristics of a unique identifier;
    (c) determining a parameter risk for each of the set of shared identifiers that describes a level of risk associated with that shared identifier; and
    (d) generating the web content inspection report to include a description of the set of shared identifiers and, for each shared identifier of the set of shared identifiers, the parameter risk.

8. The method of claim 7, further comprising, when identifying the set of shared identifiers, analyzing the set of shared values and excluding any:
(a) human readable text;
(b) web location addresses; and
(c) numeric values having a number of digits less than a configured limit.

9. The method of claim 7, further comprising, when determining the parameter risk for each shared identifier of the set of shared identifiers:
(a) determining whether the two or more tags that affect that shared identifier have a shared tag hierarchy;
(b) determining whether that shared identifier is stored in the browser storage location;
(c) determining a number of tags with different tag origins that affect that shared identifier, wherein the different tag origins describe different web locations that the number of tags are provided from; and
(d) determining whether that shared identifier is stored in the browser storage location by one of the two or more tags that affect that shared identifier.

10. The method of claim 7, wherein the web content inspection report includes, for each shared identifier of the set of shared identifiers:
(a) a description of the two or more tags that affect that shared identifier; and
(b) a description of the tag origins of the two or more tags that affect that shared identifier, wherein the tag origins describe web locations that the two or more tags are provided from.

11. The method of claim 1, further comprising:
(a) based upon a set of configured rules, identifying a set of plaintext personally identifiable information (PII) that is present within the web content or used by any tag of the plurality of tags;
(b) based upon a set of configured verifications, identifying a set of verified plaintext PII within the set of plaintext PII;
(c) generating the web content inspection report to include a description of the set of verified plaintext PII.

12. The method of claim 11, wherein the set of configured rules includes a set of regular expressions configured to identify PII within text, and wherein the set of regular expressions includes regular expressions configured to identify payment information, street addresses, email addresses, social security numbers, internet protocol addresses, and phone numbers.

13. The method of claim 11, further comprising, when identifying the set of verified plaintext PII based upon the set of configured verifications:
(a) verifying a set of payment information based upon a verification encoded within the payment information;
(b) verifying a street address using an address lookup service;
(c) verifying a social security number using context-based filtering based on the web content;
(d) verifying an internet protocol address based upon a range of valid internet protocol addresses; and
(e) verifying a phone number using a phone number lookup service.

14. The method of claim 1, further comprising:
(a) analyzing the web content and the plurality of tags to identify a consent framework that is configured for the web location;
(b) determining a set of consent options that are associated with the consent framework;
(c) configuring a virtual browser to simulate execution of tags with each of the set of consent options;
(d) while simulating selection of each of the set of consent options, monitoring the virtual browser to determine whether any unexpected tag behavior occurs; and
(e) generating the web content inspection report to include a description of any unexpected tag behavior.

15. The method of claim 14, wherein the set of consent options comprises a full consent option, a non-consent option, and a conditional consent option.

16. A content inspection system comprising a server, wherein the server includes a processor, and the processor is configured to:
(a) set a reference point that describes a state of a browser storage location, wherein the browser storage location corresponds to a location of a file system of a storage device in communication with the processor, and the browser storage location is configured to receive session data from a web content processor;
(b) receive a set of web content that is associated with a web location;
(c) interpret the set of web content with the web content processor by:
(i) executing each tag of a plurality of tags within the web content; and
(ii) where execution of any tag of the plurality of tags incorporates a sub-tag, adding that sub-tag to the plurality of tags;
where the interpreting comprises the web content processor sending session data related to the execution to the browser storage location;
(d) monitor the execution of each tag of the plurality of tags by:
(i) determining whether execution of that tag affects the state of the browser storage location relative to the reference point; and
(ii) where the browser storage location is affected, generate a browser storage event that describes that tag and any impact on the browser storage location;
(iii) detecting one or more parameters likely to comprise one or more personally identifiable information, PII, in the data processed by each tag by applying one or more parameter filters configured to filter out data that is unlikely to be PII;
(e) generate a web content inspection report that describes, for each of a plurality of browser storage events associated with the web location:
(i) a source tag that affected the browser storage location; and
(ii) a change in the state of the browser storage location caused by the source tag;
(iii) the one or more parameters likely to comprise one or more PII.

17. The system of claim 16, wherein executing each tag includes simulating the execution of each tag, and the processor is further configured to display the web content inspection report to a user device, wherein the web content inspection report includes:
(a) a tag hierarchy that visually illustrates relationships between two or more tags in the plurality of tags;
(b) a visual marker for any tag of the plurality of tags that is the source tag, wherein the visual marker indicates at least one feature of the change in the state of the browser storage location caused by the source tag.

18. The system of claim 16, wherein the processor is further configured to:
- (a) identify a set of shared values that are:
  - (i) added to the browser storage location by the plurality of tags, or configured within a browser session by the plurality of tags; and
  - (ii) affected by two or more tags of the plurality of tags;
- (b) identify a set of shared identifiers within the set of shared values, wherein each of the set of shared identifiers includes characteristics of a unique identifier;
- (c) determine a parameter risk for each of the set of shared identifiers that describes a level of risk associated with that shared identifier; and
- (d) generate the web content inspection report to include a description of the set of shared identifiers and, for each shared identifier of the set of shared identifiers, the parameter risk.

19. The system of claim 16, wherein the processor is further configured to:
- (a) analyze the web content and the plurality of tags to identify a consent framework that is configured for the web location;
- (b) determine a set of consent options that are associated with the consent framework;
- (c) configure a virtual browser to simulate selection of each of the set of consent options;
- (d) while simulating selection of each of the set of consent options, monitor the virtual browser to determine whether any unexpected tag behavior occurs; and
- (e) generate the web content inspection report to include a description of any unexpected tag behavior.

20. A method comprising:
- (a) providing a set of web content to a server that is configured to inspect the set of web content by:
  - (i) setting a reference point that describes a state of a browser storage location, wherein the browser storage location corresponds to a location of a file system of a storage device and is configured to receive session data from a web content processor;
  - (ii) receiving a set of web content that is associated with a web location;
  - (iii) interpreting the set of web content with the web content processor by:
    - (A) autonomously executing each tag of a plurality of tags within the web content; and
    - (B) where execution of any tag of the plurality of tags incorporates a sub-tag, adding that sub-tag to the plurality of tags;
    - where the web content processor sends session data related to the execution to the browser storage location;
  - (iv) monitoring the execution of each tag of the plurality of tags by:
    - (A) determining whether execution of that tag affects the state of the browser storage location relative to the reference point; and
    - (B) where the browser storage location is affected, generate a browser storage event that describes that tag and any impact on the browser storage location;
    - (C) monitoring for the presence of one or more high-risk parameters within the browser storage location, wherein a high-risk parameter is a parameter that is found among one or more tags or one or more cookies, indicating that the parameters may be a shared identifier of a user; and
- (b) receiving a web content inspection report from the server that describes, for each of a plurality of browser storage events associated with the web location:
  - (i) a source tag that affected the browser storage location; and
  - (ii) a change in the state of the browser storage location caused by the source tag;
  - (iii) the one or more high-risk parameters.

* * * * *